(12) United States Patent
Kloos et al.

(10) Patent No.: US 6,909,761 B2
(45) Date of Patent: Jun. 21, 2005

(54) DIGITAL COMMUNICATION SYSTEM HAVING IMPROVED PILOT ENCODING

(75) Inventors: Michael N. Kloos, Belvidere, IL (US); Michael S. Palac, Mount Prospect, IL (US); Yashpal Thind, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 94 days.

(21) Appl. No.: 10/326,767

(22) Filed: Dec. 19, 2002

(65) Prior Publication Data

US 2004/0120304 A1 Jun. 24, 2004

(51) Int. Cl.[7] .............................. H03D 3/24; H04B 3/10; H04J 1/16
(52) U.S. Cl. ....................... 375/376; 370/491; 370/500; 375/362; 455/237.1
(58) Field of Search ................................ 375/260, 261, 375/298, 347

(56) References Cited

U.S. PATENT DOCUMENTS

| | | | |
|---|---|---|---|
| 4,025,853 A | 5/1977 | Addeo | |
| 5,241,545 A | 8/1993 | Kazecki et al. | |
| 5,280,472 A | 1/1994 | Gilhousen et al. | |
| 5,448,759 A | 9/1995 | Krebs et al. | |
| 5,519,730 A | 5/1996 | Jasper et al. | |
| 5,548,631 A | 8/1996 | Krebs et al. | |
| 6,232,921 B1 * | 5/2001 | Aiken et al. | 342/383 |
| 6,308,072 B1 | 10/2001 | Labedz et al. | |
| 6,337,985 B1 | 1/2002 | Roux et al. | |
| 6,424,678 B1 * | 7/2002 | Doberstein et al. | 375/260 |
| 6,721,267 B2 | 4/2004 | Hiben et al. | |
| 2003/0123400 A1 * | 7/2003 | Kloos et al. | 370/317 |
| 2003/0157943 A1 * | 8/2003 | Sabat, Jr. | 455/456 |

* cited by examiner

Primary Examiner—Stephen Chin
Assistant Examiner—Harry Vartanian
(74) Attorney, Agent, or Firm—Fitch, Even, Tabin & Flannery

(57) ABSTRACT

A time division multiple access communication system is provided having multiple sub-channels according to known quadrature amplitude modulation techniques. Each sub-channel has a pre-determined time duration and is divided by a pre-determined number of symbol position time divisions. The symbol positions carry color codes and ACP codes in addition to sync, pilot and data symbols. Pilot symbols in the second half of the slot are replaced with dual purpose color code and ACP symbols. The dual purpose symbols are either modulated with a lower order modulation than data symbols or are repeated values of dedicated symbols located earlier in the same slot, or both. Slot throughput is attained with a minimal bit error rate penalty.

36 Claims, 26 Drawing Sheets

| 502 | 504 | 506 | 508 | |
|---|---|---|---|---|
| | | | | |
| | | | | |
| | | | | |
| | | | | |
| 520 | 520 | 520 | 520 | 0 |
| 520 | 520 | 520 | 520 | |
| 520 | 520 | 520 | 520 | |
| 524 | 524 | 522 | | |
| | | | | |
| 526 | | | 526 | 5 |
| | | | | |
| 530 | | | | |
| 530 | | | | |
| 530 | 526 | 526 | | |
| | | | | |
| | | | | |
| | | | | |
| 526 | | | 526 | 13 |
| | | | | |
| | | | | |
| | | | | |
| | 526 | 526 | 530 | |
| | | | 530 | |
| | | | 530 | |
| 526 | | | 526 | 21 |
| | | | | |
| | | | | |
| | | | | |
| | 526 | 526 | | |
| | | | | |
| | | | | |
| | | | | |
| 526 | | | 526 | 29 |

FIG. 5

| 502 | 504 | 506 | 508 | |
|---|---|---|---|---|
|  |  |  |  | 30 |
|  |  |  |  |  |
|  |  |  |  |  |
|  | 526 | 526 |  |  |
|  |  |  |  |  |
|  |  |  |  |  |
|  |  |  |  |  |
| 526 |  |  | 526 | 37 |
|  |  |  |  |  |
|  |  |  |  |  |
| 530 |  |  |  |  |
| 530 | 526 | 526 |  |  |
| 530 |  |  | 530 |  |
|  |  |  | 530 |  |
|  |  |  | 530 |  |
| 526 |  |  | 526 | 45 |
|  |  |  |  |  |
|  |  |  |  |  |
|  |  |  |  |  |
|  | 526 | 526 |  |  |
|  |  |  |  |  |
|  |  |  |  |  |
|  |  |  |  |  |
| 526 |  |  | 526 | 53 |
|  |  |  |  |  |
|  |  |  |  |  |
|  |  |  |  |  |
|  |  |  |  |  |
|  | 526 | 526 |  |  |
|  | 522 | 524 | 524 | 59 |
| 520 | 520 | 520 | 520 |  |
| 520 | 520 | 520 | 520 |  |
| 520 | 520 | 520 | 520 |  |
|  |  |  |  |  |
|  |  |  |  |  |

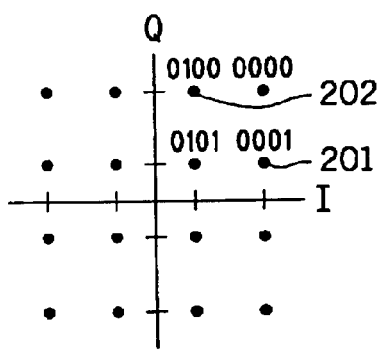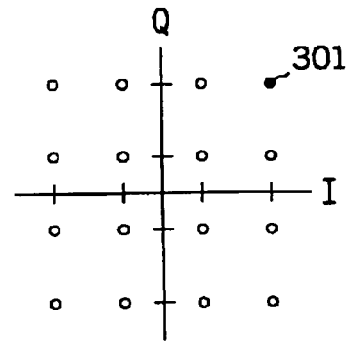
200 300
FIG. 16   FIG. 17
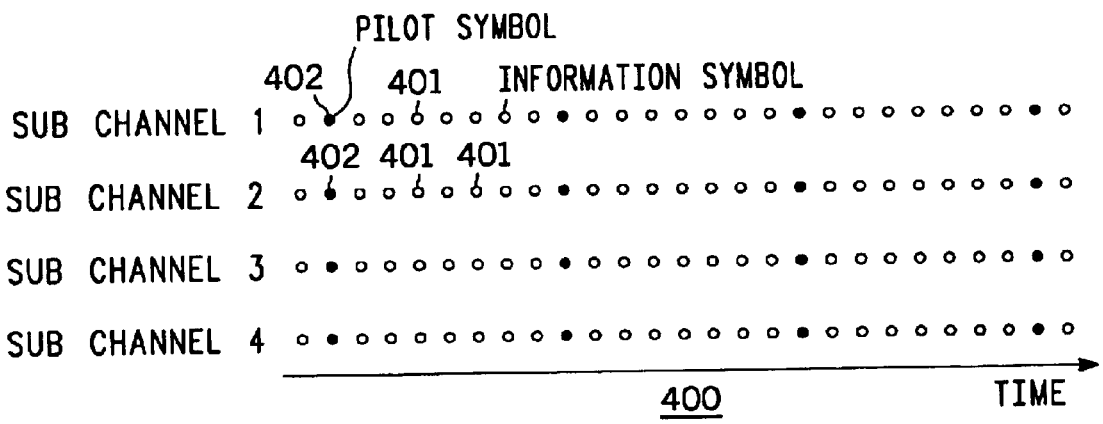
FIG. 18
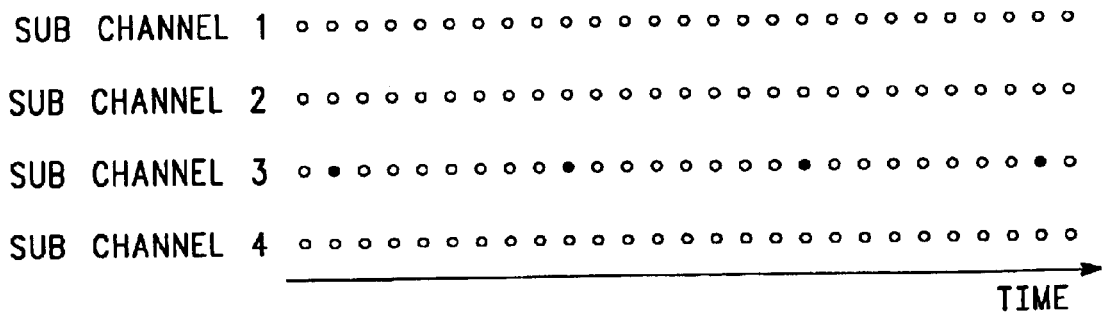
FIG. 19

DIGITAL COMMUNICATION SYSTEM HAVING IMPROVED PILOT ENCODING

BACKGROUND OF THE INVENTION

1. Field of the Invention

The present invention pertains to digital communication systems and in particular to digital receiver systems which use imbedded time-domain pilot components to facilitate recovery of information components.

2. Description of the Related Art

The present invention is directed to communication systems in which an information signal is modulated onto a carrier signal and is transmitted to a remote location where the information signal is demodulated and recovered. Various modulation schemes have been employed to increase the information handling capacity of the communication path. One notable example is the 16 point Quadrature Amplitude Modulation (QAM) approach which provides a constellation of modulation values defined by phase and amplitude, which represent information bits. Such QAM signals typically transmitted in conjunction with a pilot component. Pilot components may be employed to support synchronization and to otherwise support recovery of information components of the QAM signal which are broadcast in conjunction with one or more pilot tones that are offset in frequency from the content of the information component. Unfortunately, the multiplicity of pilot references needed to support recovery of information packets consume bandwidth which could otherwise be devoted to information content. Improvements to through-put capacity of communication systems is desirable and techniques for increasing through-put are continually sought.

SUMMARY OF THE INVENTION

The present invention provides communication techniques which improve through-put of communication systems. The present invention also provides through-put improvements to existing communication systems, without requiring substantial modification of procedures and equipment employed in the communication systems. Pursuant to this invention, an original information signals is combined with a reference signal containing at least one pre-determined sample which serves as a time domain pilot reference used for recovery of the original information signal at a remote location. According to principles of the present invention, iterative combinations of information and time domain pilot references with additional higher order modulation time domain pilot references. When received at a remote location, lower order data modulation symbols are used as pilots to decode higher order modulation data symbols, thereby increasing channel bandwidth.

BRIEF DESCRIPTION OF THE DRAWINGS

FIGS. 5 and 6 together comprise a top plan view thereof, taken on an enlarged scale;

FIG. 16 is a diagrammatic representation of a 16 QAM symbol constellation;

FIG. 17 is a diagram of a 16 QAM symbol constellation with one of the symbols comprising a pre-determined pilot reference symbol;

FIGS. 18–24 comprise timing diagrams showing a series of symbol sequences;

DETAILED DESCRIPTION OF THE PREFERRED EMBODIMENT

Figure 1:
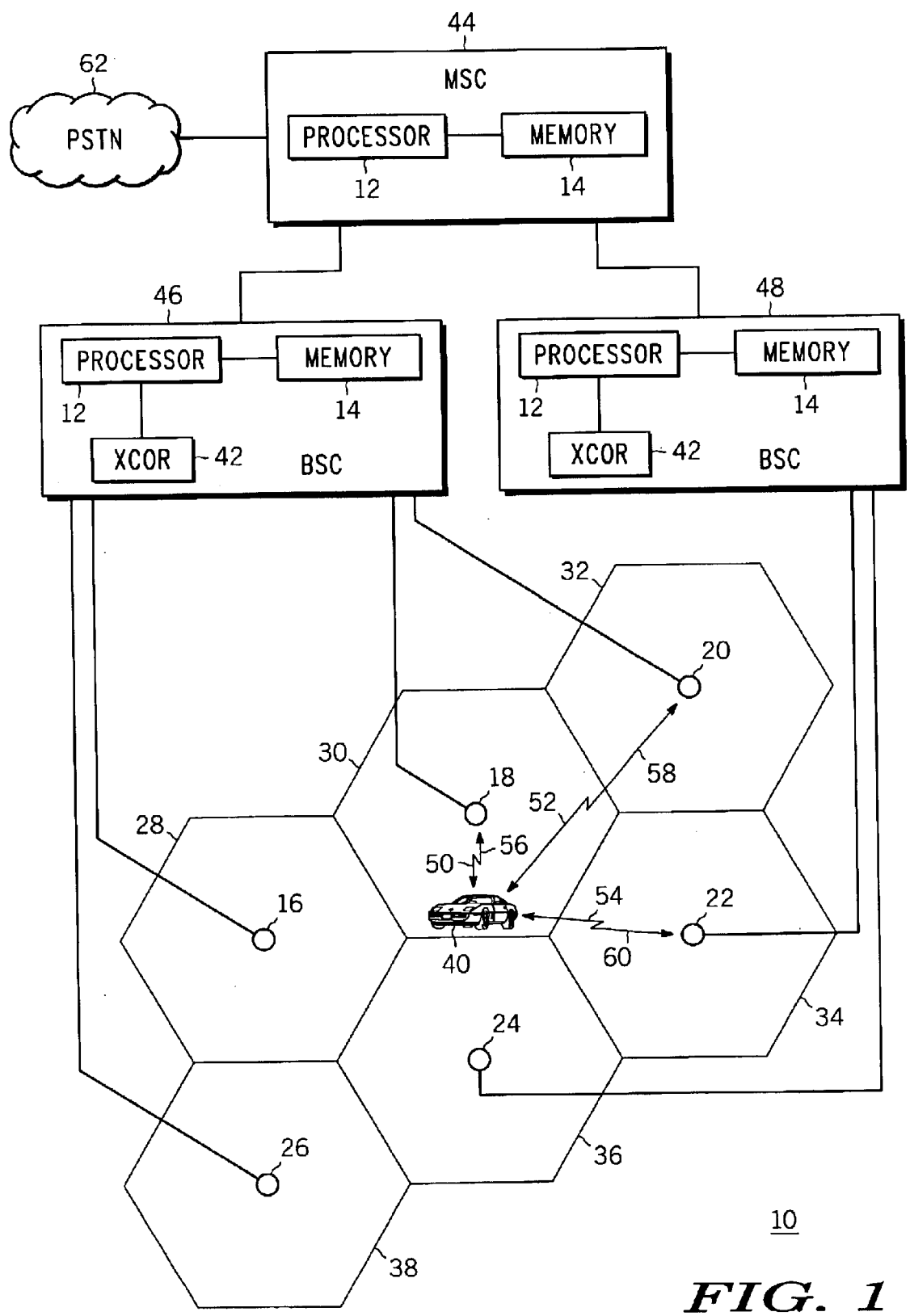
FIG. 1 is a schematic diagram of a wireless communication system in accordance with the preferred embodiment of the present invention.

The present invention pertains to wireless communication systems and in particular to such systems utilizing digital processing technology with embedded time domain pilot components. Referring to the drawings, FIG. 1 illustrates a wireless communication system 10, such as a time division multiple access (TDMA) digital radiotelephone system. Fixed communication units such as base transceiver stations (BTS) 16, 18, 20, 22, 24, and 26, also referred to as cells, communicate with a mobile station 40, also referred to as a mobile unit, operating within area 30. Areas 28, 30, 32 and 38 are served by BTSs 16, 18, 20 and 26 respectively, while areas 34 and 36 are served by BTSs 22 and 24. BTSs 16, 18, 20 and 26 are coupled to a base station controller (BSC) 46, which comprises, among other things, a transcoder (XCDR) 42, a processor 12, and a memory 14, and which is in turn coupled to a mobile switching center (MSC) 44, also comprising a processor 12, and a memory 14. Similarly, BTSs 22 and 24 are coupled to BSC 48 which comprises, among other things, a XCDR 42, a processor 12, and a memory 14, and which in turn is also coupled to MSC 44. BSCs 46 and 48 may be referred to as a base station subsystem (BSS). A BSS may also be defined as a single BSC and its associated BTSs. MSC 44 is coupled to the public switched telephone network (PSTN) 62. The PSTN, MSC, and BSS are generically referred to as the infrastructure.

Wireless communication between BTSs 16, 18, 20, 22, 24, and 26 and mobile unit 40 occurs via radio frequency (RF) channels which provide physical paths over which digital communication signals such as voice and data are transmitted. Base-to-mobile unit communications are said to occur on a forward link, while mobile-to-base unit communications are referred to as being on a reverse link.

As shown in FIG. 1, a communication signal 50 has been transmitted on the forward link channel such as a traffic channel, by base station 18 to mobile station 40. Additionally, a communication signal 56 has been transmitted on a reverse link channel such as a traffic channel by mobile station 40 in response to communication signal 50 from base station 18.

Wireless communication system 10 provides a number of logical channels (not shown) that are separated into two categories, traffic channels and signaling channels. The signaling channels are intended for carrying signaling information for broadcast control, mobile unit access control, synchronization, and mobility management. The traffic channels are intended for carrying encoded network data, but also support signaling for mobile station management. The mobile station management signaling on the traffic channel will either steal network data frames or will reduce the throughput of network data frames on the traffic channel, so the frequency of these transmissions is very low.

The present invention has found immediate application with a communication system commercially available from Motorola, Inc. referred to as Integrated Dispatch Enhanced Network ("iDEN"). This communication system is a high-capacity digital trunked radio system providing integrated voice and data service. The system uses 16 QAM digital modulation and Vector Sum Excited Linear Predictor (VSELP) speech coding techniques and Time Division Multiple Access (TDMA) channel access methodology to provide enhanced system services and channel capacity. As will be seen herein, the present invention provides further enhancement to the systems services, as well as increasing the channel capacity.

In the MOTOROLA "iDEN" system, a single inbound/outbound frequency pair is shared among three or six users via six 15 millisecond time slots, with each user transmitting and receiving during an assigned time slot interval. As a result, inbound transmission is a pulsed RF signal with a ⅙ or ⅓ duty cycle. Each user is assigned a unique channel designation which is a function of a time slot definition and carrier number specifying the inbound/outbound frequency pair. In dense usage areas, frequency pairs assigned to one user are re-used in other geographical areas. Due to atmospheric and other effects, the re-used inbound/outbound frequency pairs may interfere with one another.

The MOTOROLA "iDEN" communication system combines the capabilities of digital dispatch and digital cellular interconnect into a single system. The 16 QAM modulation technology used in the "iDEN" system conveys either three or six communication circuits into a single 25 kHz RF channel. Each frequency (or group of frequencies) is arranged in a cellular pattern such as that illustrated in FIG. 1. For example, cells 28, 36 and 38 operate at frequency 1, frequency 2 and frequency 3, respectively. Nearby cell 34 could be assigned frequency 1, the same frequency as that used in non-contiguous cell 28. As depicted in FIG. 1, the cellular areas of operation designated by numerals 28 and 34 are separated by cell 36. Usually, the spatial separation is sufficient to prevent interference between the co-channels 28 and 34. However, due to conditions of terrain and weather, interference between cells 28 and 34 can arise, especially in relatively dense communications areas, such as major metropolitan centers. In order to avoid costly capital investment to address random occurrences of interference, systems of color code protections have been devised to distinguish potential co-channel interferers.

As mentioned above, the present invention has found immediate application in TDMA communication systems utilizing embedded time domain pilot components. Such pilot components appear only from time to time and are therefore referred to as existing in the time domain, as distinguished from frequency domain pilot components utilized in other systems. Information components of a particular QAM transmission may be combined with an in band pre-determined pilot reference component that appears in a periodic manner, thus providing the time domain basis for the pilot component. In some TDMA digital communication systems, known pilot symbols are transmitted in a channel to allow the receiver to reduce the affects of fading. Communication systems of the type referred to herein are sometimes employed in an RF communication environment where communication units are carried on mobile platforms which may be in motion with respect to one another. In such systems, the land-mobile radio channel is characterized by multipath fading that causes the channel phase and amplitude to vary over time as the receiving or transmitting unit moves about. The land-mobile radio channel may also be susceptible to frequency-selective fading, where the delay differences between the various multipath components that arrive at the receiver become larger enough relative to the signaling rate in the channel. This causes time variant phase and amplitude variations with frequency and results in distortion which is independent of the strength of the received signal. In data communication systems, such distortion causes an error floor which cannot be reduced, regardless of the strength of the received signal.

Figure 15:
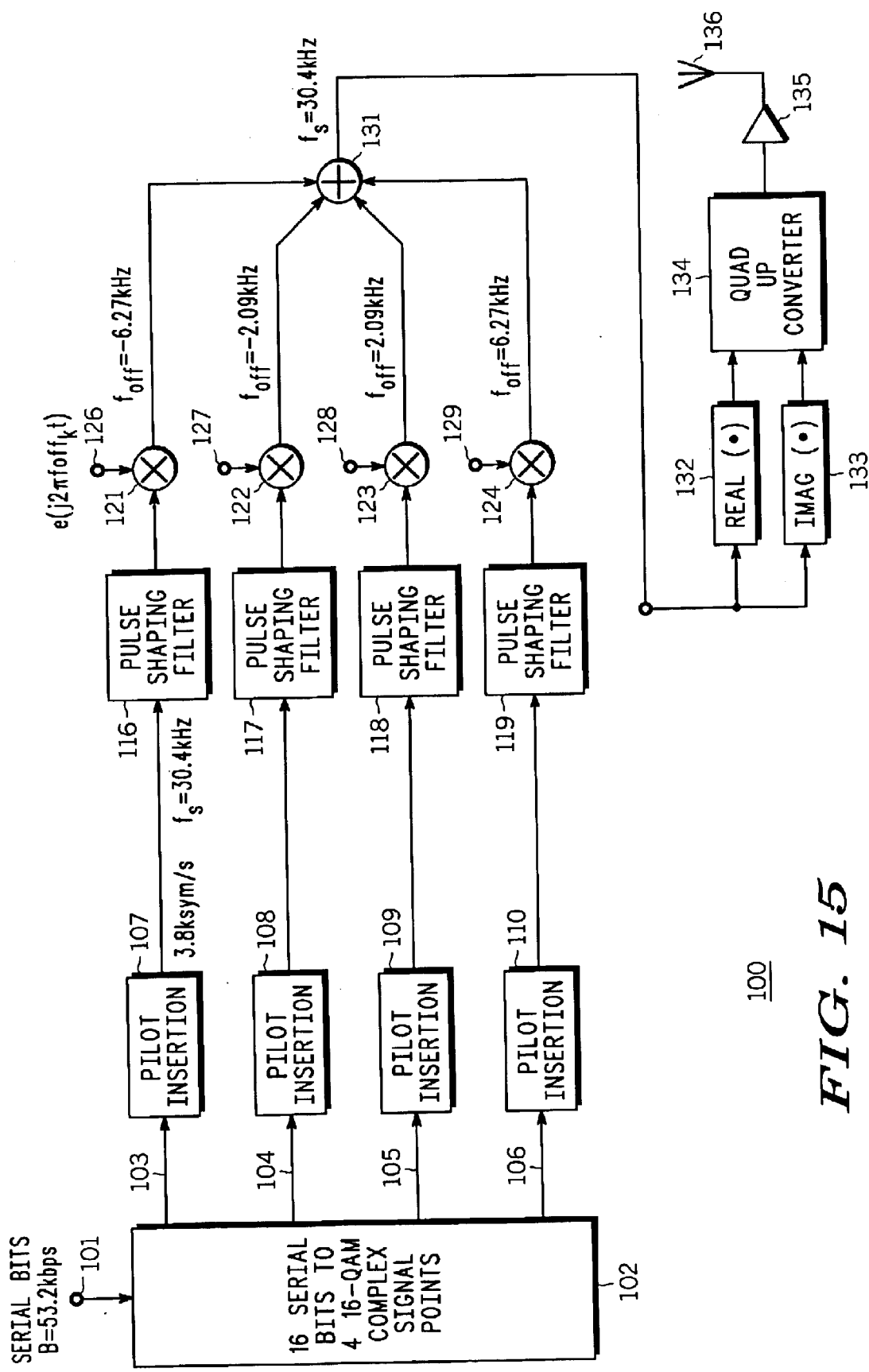
FIG. 15 is a block diagram of a signal processor suitable for use in a transmitter employed by the present invention.
Figure 20:
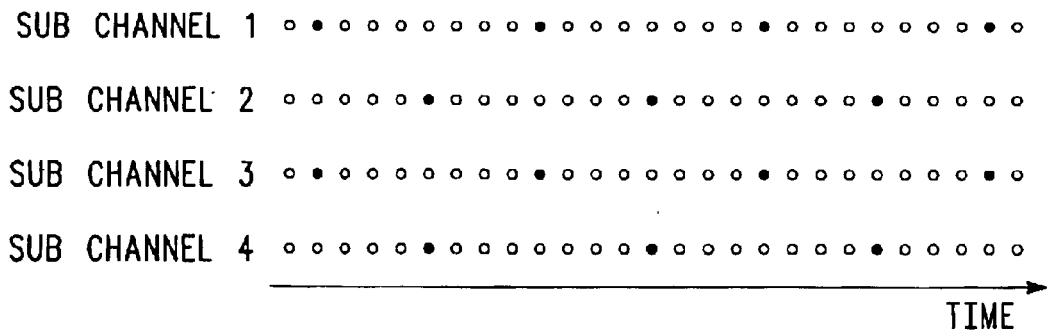

Referring now to FIG. 15, a signal processor for preparing a signal for transmission is generally indicated at 100. A processing unit 102 receives an original information signal 101. In this particular embodiment, this information signal constitutes a serial bit stream having an effective baud rate of 53.2 kilobits per second. This bit stream can represent, for example, true data, digitized voice, or other appropriate signals. Alternate embodiments of the invention contemplate an analog original information signal 101. An analog original information signal (e.g., voice information) would, prior to conversion into QAM-symbols, be converted to a digital form.

The processing unit 102 functions to convert groups of 16 serial bits of the original information signal into four 16 QAM complex signal points (symbols). For example, FIG. 16 depicts a 16 QAM complex signal symbol constellation 200. Each symbol in the constellation represents a different combination of four serial bits. For example, a first one of these symbols 201 represents the bits "0001." A second symbol 202, on the other hand, represents the bits "0100," all in accordance with well understood prior art methodology.

For each serially received 16 original information bits, the processing unit 102 outputs, in parallel, on each of 4 signal paths 103–106, an appropriate representative multibit symbol as described above. A pilot insertion unit 107–110, located in each signal path 103–106, inserts a predetermined symbol following receipt of 7 serially received information symbols from the processing unit 102 pursuant to one embodiment of a communication methodology in accordance with tile invention. For example, with reference to the constellation 300 depicted in FIG. 17, the symbol depicted by reference numeral 301 can, by way of example, serve as the predetermined symbol inserted by the pilot insertion unit 107–110. Other symbols within the constellation could of course be used.

Arbitrary signal points not within the constellation could also be used in an appropriate application. Although a particular symbol is used to represent the pilot reference in this manner, this does not mean that this same symbol cannot serve as a multibit symbol for other symbol locations in the symbol stream, and the predetermined symbol may perform a dual function.

It is not necessary that all of the pilot symbols be identical or spaced in time by a regular, uniform interval; it is only necessary that they be selected in a predetermined way being preferably selected without regard to—i.e., independent of—the original information signal. The resulting output from the pilot insertion units 107–110 comprises a symbol stream (in this embodiment having a symbol rate of 3.8 kilo symbols per second) that is as generally depicted in FIG. 18 by reference numeral 400. As depicted, a predetermined symbol 402 constituting a pilot reference serially appears following each seven informational data symbols 401. This symbol stream forms a composite signal that comprises one non-informational pilot reference symbol for every seven informational data symbols. The composite signals are provided to pulse shaping filters 116–119 that appropriately shape the symbols for transmission. Thereafter, each composite signal is mixed using mixers 121–124 with an appropriate injection signal 126–129 of the form $e^{(-j2\Pi f_{offk})}$, wherein j is the square root of negative one, t is time, and $f_{offk}$ comprises an offset frequency corresponding to the kth composite signal.

All of the above parameters will be identical for each of the injection signals 126–129 with the exception of the frequency offset value. In this embodiment, the first injection signal 126 has an offset frequency value of 6.27 kHz. The second injection signal 127 has an offset frequency of minus 2.09 kHz. 2.09 kHz comprises the offset frequency for the third injection signal 128, and 6.27 kHz comprises the offset frequency for the fourth injection signal 129. The filtered and offset composite signals are thereafter combined 131 to form a modulation signal. The real and imaginary parts of this complex modulation signal are separated 132, 133 and provided to a quadrature upconverter 134, following which the signal is amplified 135 and applied to an antenna 136 for transmission, the latter occurring in accordance with well-understood prior art methodology.

Figure 26:
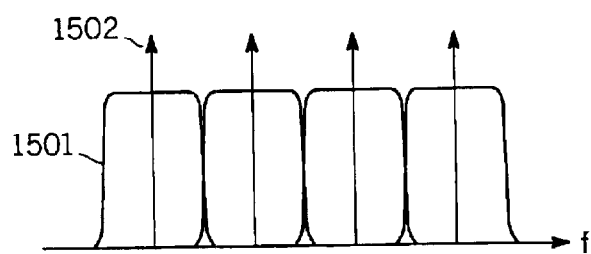
FIG. 26 is a spectral diagrammatic representation of a plurality of sample sequences.

Referring to FIG. 26, the resultant shaped, frequency offset, and combined 16 QAM symbol sequences are generally represented by reference numeral 1500. As generally depicted in this spectral diagram, there are four effective sub-channels of symbol information 1501, each being offset from the others in correlation to the offset frequencies referred to above. In this embodiment, each sub-channel symbol also comprises a time domain pilot reference sequence 1502 embedded therein.

Figure 21:
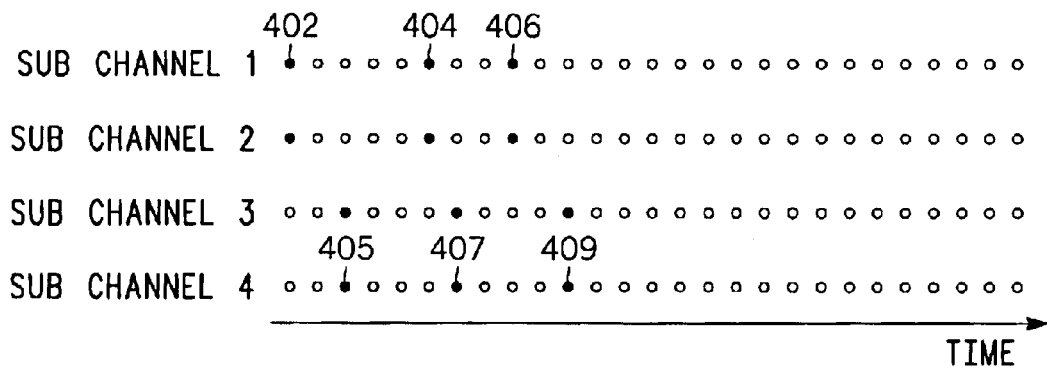

It is not necessary that each 16 QAM sub-channel symbol of this quad 16 QAM packet comprise an embedded time domain pilot reference. For example, only one of the QAM signals might comprise the pilot reference, as illustrated in FIG. 18, with interpolation techniques being used during reception to provide an estimated pilot reference for use in recovering the remaining 16 QAM sub-channels. The filter interpolation technique, later described, may be applied to other pilot sequences as well. For example, FIG. 21 shows a pilot sequence which has both time staggered, and time coincident characteristics, in particular, at times 402, 404, 406, the pilot symbols on sub-channel 1 and sub-channel 2 are time coincident with each other, while sub-channel 3 and sub-channel 4 have no pilot symbols. By contrast, at times 405, 407, 409 sub-channels 3 and 4 have time coincident pilot symbols, while sub-channels 1 and 2 have no pilot symbols. In FIG. 21, the occurrences of pilot symbol sequences in channels 1 and 2 and the occurrences of pilot sequences in channels 3 and 4 are considered to be mutually exclusive.

The pilot symbols may be inserted on mutually exclusive sub-channel subsets, such as {1&2}, {3&4}, {1&3}, etc. wherein the elements of each subset are mutually exclusive. By combining time coincident piloting (e.g., 402), and time-staggered piloting (e.g., piloting at time 405 relative to time 402). Mutually exclusive sub-channel pairs (e.g., sub-channels 1 & 2, 3 & 4, etc.) can be utilized to simultaneously enhance time interpolation over all the sub-channels and phase/amplitude correction calculations, as later described. The recurring intervals of these sub-channel subsets can be either periodic (as in times 405, 407, 409) or aperiodic (as in times 402, 404, 406).

Figure 22:
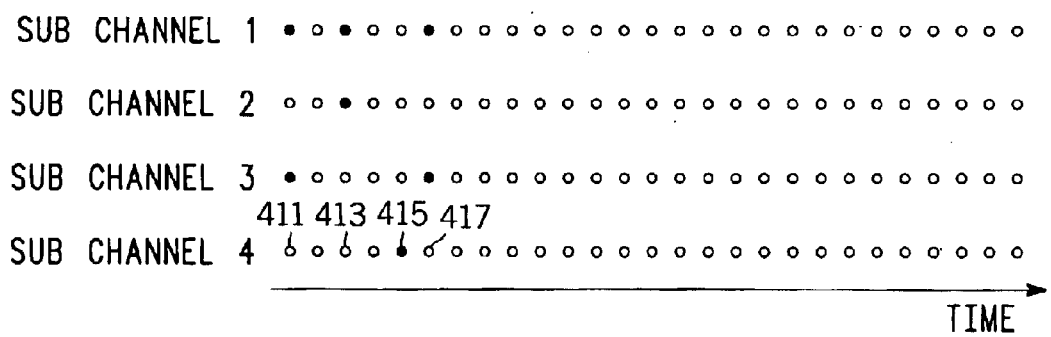
Figure 23:
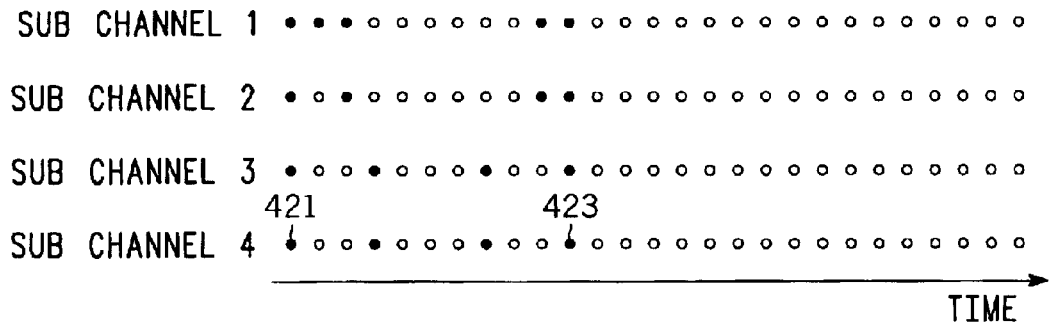

Referring now to FIG. 22, a first subset of channels, i.e., 1 and 3, has pilots on channels 1 and 3 at time 411. A second subset of sub-channels, i.e., sub-channels 1 and 2, have pilots on sub-channels 1 and 2 at time 413. A third subset of channels, i.e., channel 3, shows only a single sub-channel 4 being piloted at time 415, while time 417 has pilots on the first subset of channels, 1 and 3. If desired, time coincident pilot symbols may be located on all 4 sub-channels at times 421 and 423, as shown in FIG. 23. Multiple corrective time coincident pilots can be used to make conventional phase/amplitude correction calculations.

Figure 24:
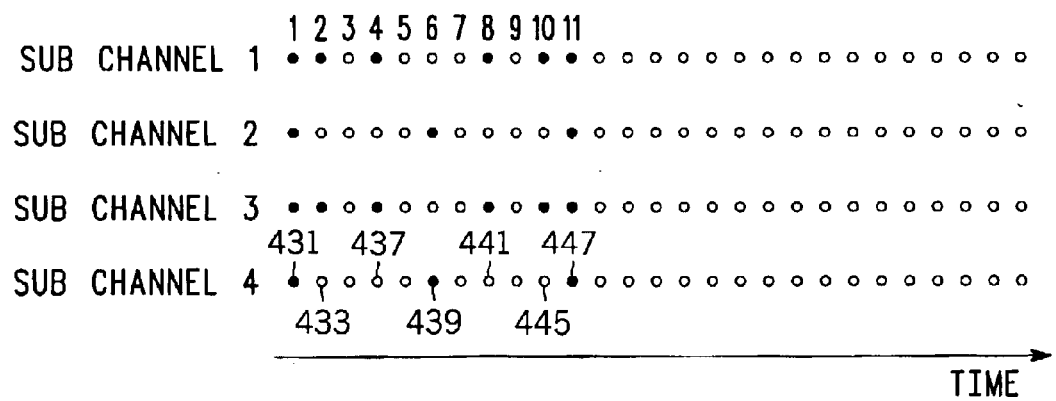

Referring to FIG. 24 another stream of information-bearing QAM symbols and combined pilot sequences are shown employed, in a time division multiplex (TDM) system having multislot data frames. Such systems generally make pilot symbols available only for the slot to which the user is assigned, such as when the receiver is cycled on only for the assigned slot (e.g., to save battery power). This limitation on pilot availability has significant implications on pilot interpolation filter design. In particular, use of an interpolation technique having a fixed number of sample points (e.g., fixed number of, pilots per time slot) must properly weight these sample points according to where they are with respect to the data symbol being interpolated. It should be noted that periodically occurring pilot symbols (e.g., as shown on sub-channels 2 & 4) are not readily suitable for maintaining a uniform interpolation error across the timeslot. This is due, in part, to the fact that the interpolation mean square error (MSE) tends to be much higher near the ends of the timeslot than in the middle of the timeslot. This non-uniform error across the timeslot degrades the overall carrier recovery performance. By contrast, a periodically spaced pilot symbols (e.g., as shown on sub-channels 1 & 3), in concert with appropriate weighting factors, or coefficients, allows the interpolation error to be made substantially uniform across the time slot. (i.e., interpolated values at the beginning, i.e., times 431, 433, and 437, and ends, i.e., times 441, 445, and 447, are substantially as accurate as those in the center 439 of the time slot).

By judiciously using additional pilot symbols near the ends of the timeslot, the MSE across the timeslot can be made substantially uniform, thereby providing a significant improvement in the performance of the carrier recovery system. In particular, the time-dependent error contribution is accounted for, thereby making the error across the timeslots substantially independent of symbol location within the timeslot. Further, these coefficients may be stored in memory and indexed according to sub-channel and data symbol position.

Whether the pilot symbol sequences are periodic in nature or aperiodic, the position in the time slot, that is, the time of occurrence of the pre-determined pilot symbols is known at each sub-channel receiver. With this information, channel gain (which is a complex entity that scales and rotates a transmitted signal and comprises the phase and/or amplitude modulation of a signal by the transmission channel) is interpolated over time and/or frequency, and is compensated for by the receiver(s), as necessary for that particular sub-channel, to recover the information of interest. Pilot sequences for the various sub-channels might be staggered in time relative to each other, as depicted in FIGS. 3–14, to allow interpolation over time and frequency of estimated pilot references for use in recovering symbols for all sub-channels. In this manner, a plurality of QAM signals are substantially simultaneously provided, in a manner frequency offset from one another, with one or more of the QAM signals comprising an embedded time domain pilot reference.

Figure 27:
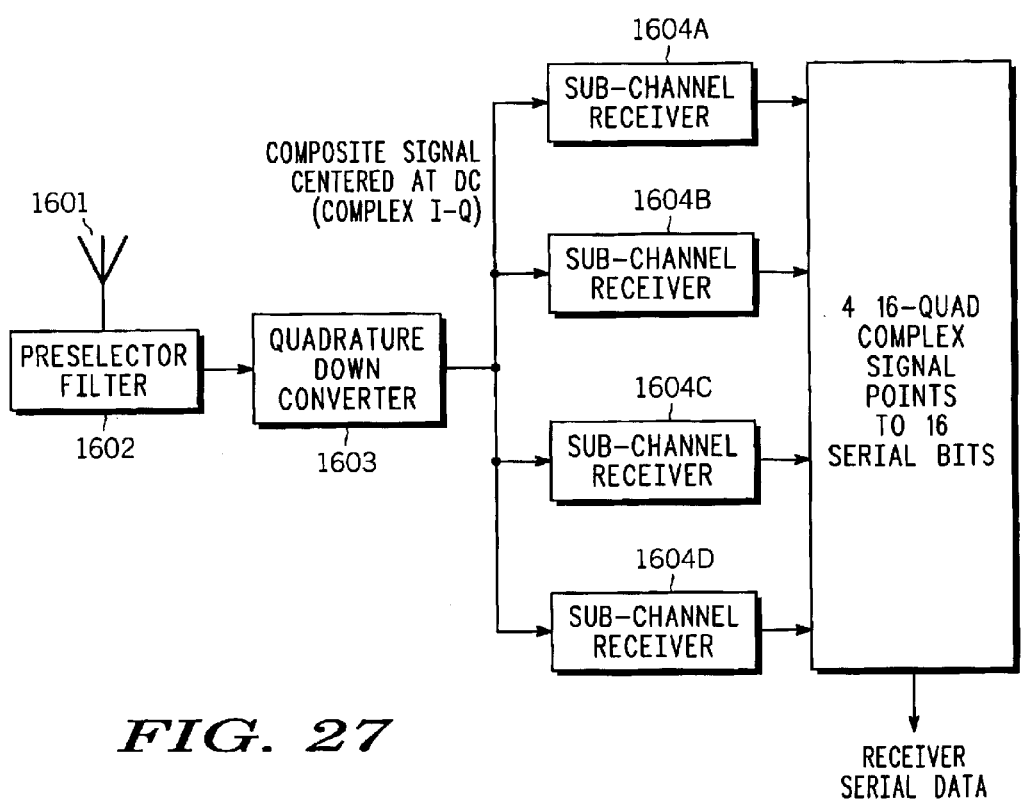
FIGS. 27 and 28 comprise block diagrams of a receiver employed in carrying out the present invention.

Referring now to FIG. 27, a receiver 1600 is suitable for use in recovering the above described signal. Following appropriate reception of the transmitted signal as provided by, for example, an antenna 1601, preselector 1602, and quadrature downconverter 1603, a composite signal centered substantially at zero frequency is provided to a bank of sub-channel receivers 1604A–D, for the purpose of recovering the original 16 QAM signals. Operation of the sub-channel receivers is further illustrated in FIG. 28. The composite signal (still comprising 4 parallel sub-channels) is mixed at 1606 with the appropriate injection signal of the form $e^{(-j2\Pi f_{\text{offk}})}$, in order to center the desired sub-channel at approximately zero frequency (i.e., to remove the frequency offset introduced at the transmitter). A receiver pulse shaping filter 1607 receives this mixed signal and appropriately shapes the received signal and filters out the other sub-channel signals and noise to produce a single sub-channel signal.

A symbol sampler 1608 then allows individual symbols to be sampled and provided to both of two processing paths 1609 and 1610. The first signal processing path 1609 comprises a pilot sampler 1611 that selects the pilot symbols from the composite symbol sequence comprising data and pilot symbols. The pilot samples are then multiplied 1612 by the reciprocal 1613 of the original transmitted pilot symbol (which is known at the receiver by virtue of having been predetermined), to provide an estimate of the channel gain corresponding to the pilot sampling instant. A pilot interpolation filter 1614 then processes this recovered pilot sequence to obtain an estimate of the channel gain at the intervening data symbol instants.

The pilot interpolation filter 1614 may be one-dimensional, i.e., for time domain only pilots as shown in FIGS. 18 and 19, or two-dimensional, i.e., for pilots varying with both time and frequency as shown in FIGS. 20–24. The operation of the interpolation filter 1614, either one- or two-dimensional, may be better understood in consideration of FIG. 25 and the following equation, which shows the interpolation channel gain estimate, $y_{j,m}$, for the $j^{th}$ data symbol on sub-channel m:

$$y_{j,m} = \frac{\Sigma}{K_{j,m}} \left[ i\varepsilon \frac{\Sigma}{K} (C_{o,l,k,m})(P_{i,k}) \right]$$

where:

$[W_{j,m,i,k}]C_{i,k,j,m}$,=interpolation weighting coefficient for the data symbol at time j of sub-channel m using the $i^{th}$ pilot symbol of sub-channel k;

$P_{i,k}$=corrected pilot channel gain sample for the $i^{th}$ pilot symbol of sub-channel k;

$k_{j,m}$=Predetermined subset of sub-channels to be used for interpolation for the $j^{th}$ data symbol [at time j] on sub-channel m; and $l_k$=predetermined subset of the available corrected pilot channel gain samples for the sub-channel denoted by k.

Figure 28:
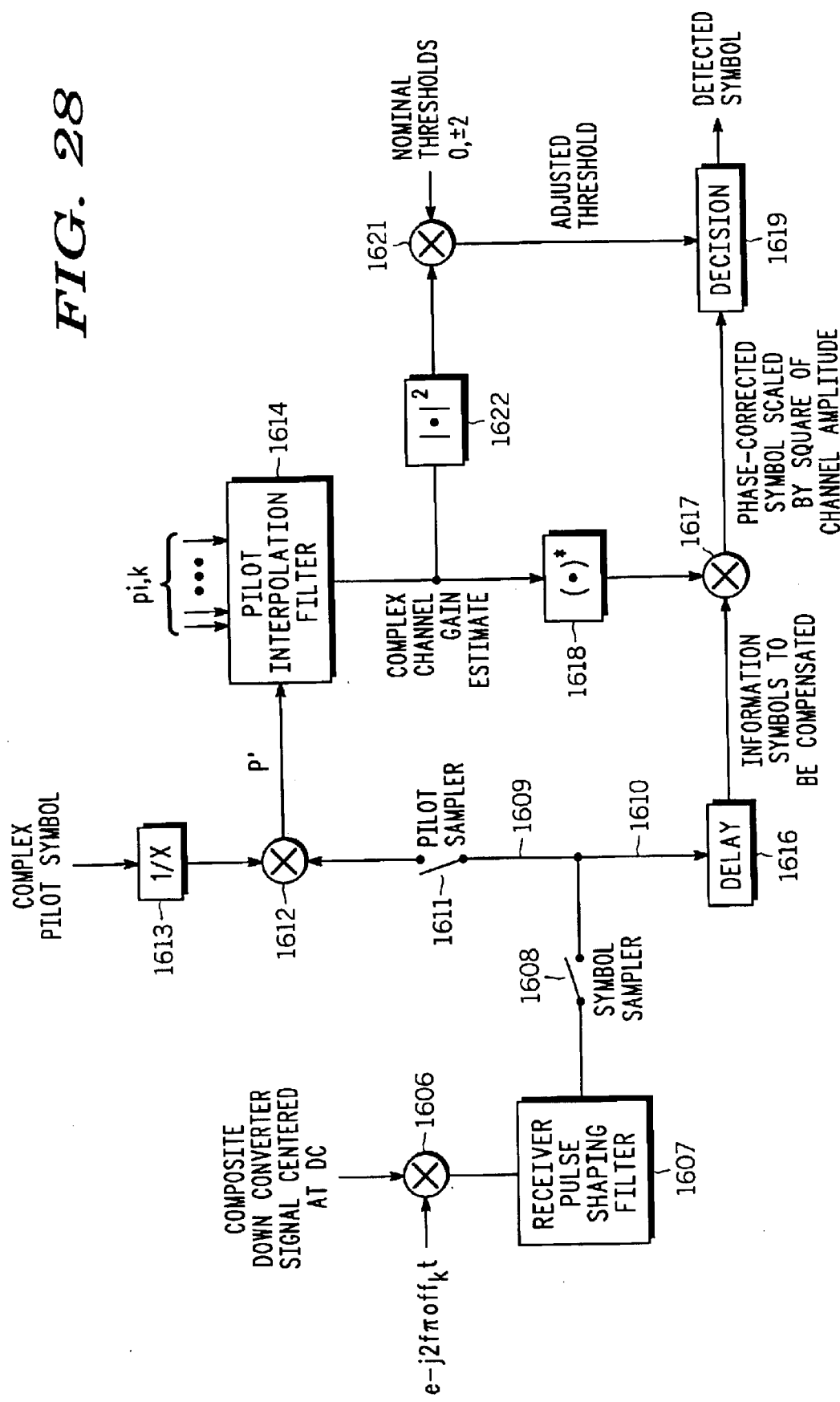

Equation 1 may be implemented in each of the sub-channel receivers 1604A–1604D, an example of which is shown in the simplified block diagram of FIG. 28. Interpolation for the data symbol at time 461 on sub-channel 2 is graphically shown in FIG. 25. It is assumed that this symbol is interpolated over time (i.e., using 3rd and 4th pilots on sub-channel 2) and frequency (i.e., using 2nd and 3rd pilots from the adjacent sub-channel 1). In accordance with the above equation, each of the corrected pilot channel gain sample values ($P_{i,k}$) are weighted 453–456, using the appropriate weighting coefficient ($W_{[i,k],[j,m]}$), and summed 457, 458 for each sub-channel. Each of these signals are then summed 459, if appropriate, across sub-channels to yield the interpolated channel gain estimate for use in detecting data symbol 461.

In certain instances, phase and amplitude differences arise between the raw pilot symbols taken from different sub-channels. Such differences are due, at least in part, to the phase-versus-frequency response of the preselector filter 602, (shown in FIG. 27). That is, since the pilots used for (two-dimensional) interpolation are necessarily taken from sub-channels having different frequencies, the effect of this difference in frequency must be removed before the raw pilot data can be used. Namely, the phase and/or amplitude values of the raw pilot symbols taken from other sub-channels (i.e., "off-channel") must be corrected to correspond to the sub-channel in which the data symbol is being interpolated (i.e., "on-channel").

Figure 25:
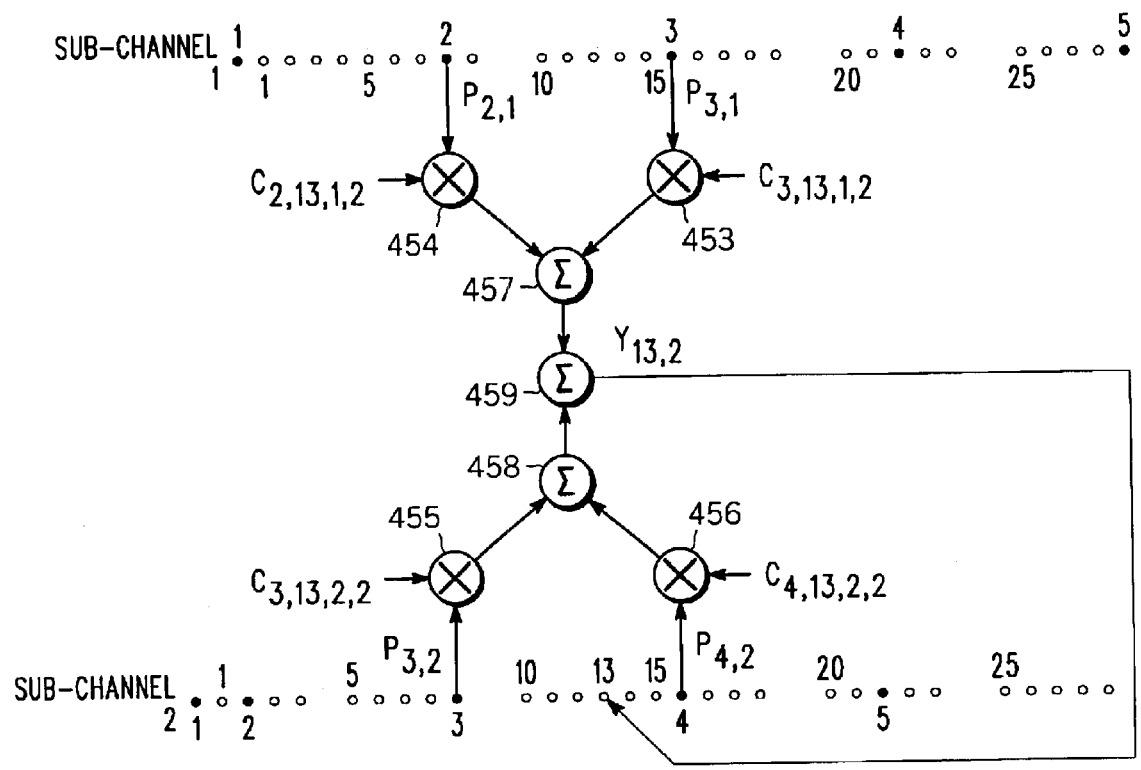
FIG. 25 is a graphical representation of data symbol interpolation using pilot symbols.

While the relationship of phase vs. frequency response of the filter is substantially linear, it is anticipated that it could be described by a polynomial of an order higher than 1. Phase and/or amplitude correction factors for the off-channel pilot channel gain samples are calculated and applied to the raw pilot channel gain samples ($P'_{i,k}$ in FIG. 28) to yield the corrected pilot channel gain samples ($P_{i,k}$). (The corrected pilot channel gain samples are then multiplied by the weighting coefficient ($W_{[i,k],[j,m]}$) as shown in FIG. 25.) These complex correction factors are calculated for time coincident pairs of pilot samples which will be used in the interpolation for an on-channel data symbol. Mathematically, the raw pilot channel gain samples on sub-channels m and sub-channel k can be represented in vector form by:

$$P'_{i,m} = \alpha_{i,m} e^{j\theta_{i,m}} \tag{2}$$

and, $$P'_{i,k} = \alpha_{i,k} e^{j\theta_{i,k}} = \alpha_{i,k} e^{j(\phi + \theta_{j,m})} \tag{3}$$

The respective phase and amplitude values for raw pilot channel gain samples transmitted on sub-channels m and k, are shown in Equations (2) and (3), respectively. These raw pilot vectors may be used to interpolate a particular data symbol on sub-channel m, while sub-channel k is considered to be an "off-channel". In order to determine the phase difference between the on-channel pilots and the off-channel pilots, the product of the on-channel pilot vector and the complex conjugate of the off-channel pilot vector is calculated as follows:

$$a = P'_{i,m} \cdot P'_{i,k} *= \alpha_{i,m} e^{j\theta_{i,m}} \cdot \alpha_{i,k} e - j(\phi\theta_{i,m}) \quad (4)$$
$$= \alpha_{i,m}\alpha_{i,k} e - j\phi$$

The phase difference between the two vectors, is given by arg{a}, i.e., $-\phi$. In a preferred embodiment, the phase correction factor for each pair of sub-channels is derived by calculating the intermediate result, a, for one or more pairs of time coincident raw pilot channel gain samples and then summing these intermediate results to generate an "average" value. The resulting accuracy of the phase correction factor increases as more time coincident pairs are comprised in this summation.

Similarly, the amplitude ratio (a unitless real quantity, b) can be calculated as:

$$b = \frac{|P'_{i,m}|}{|P'_{i,m}|} = \frac{\alpha_{i,m}}{\alpha_{i,k}} \quad (5)$$

Thus, the complex correction factor, $C_{k,m}$, which allows using pilots from sub-channel k in the interpolation calculations for sub-channel m, is given by:

$$C_{k,m} = b \cdot e^{j \cdot arg(a)} = \frac{\alpha_{i,m}}{\alpha_{i,k}} e^{-j\phi} \quad (6)$$

In the preferred embodiment, a unique correction factor is calculated for each sub-channel pair. This calculation may be made, for example, at a time when all sub-channel pilots are time coincident with respect to each other, such as times 421, and 423 in FIG. 23. The corrected pilot channel gain sample, $P_{i,k}$, is given by the equation:

$$P_{i,k} = C_{k,m} \cdot P'_{i,k} \quad (7)$$

The pilot channel gain sample (p') is thereby provided for use on other sub-channels for frequency domain interpolation, as needed:

Compensation of channel phase and amplitude distortion and recovery of the original data symbols are carried out as follows. Delay 1616 provided in the second processing path 1610 serves to time-align the estimated channel gains with the corresponding data symbols.

The delayed data symbols are multiplied at 1617 by the complex conjugates 1618 of the estimated channel gains. This operation corrects for channel phase but results in the symbol being scaled by the square of the channel amplitude. This is taken into account in the decision block 1619 with appropriate input from a threshold adjustment multiplier 1621 that itself utilizes nominal threshold information and a squared representation of the complex channel gain estimate 1622. The symbols received may have suffered degradation due to, for example, phase rotation and/or amplitude variations due to transmission and reception difficulties.

By use of information regarding phase and/or amplitude discrepancies and/or effects that can be gleaned from the pilot interpolation filter, however, the symbols as output from the mixer are properly phase compensated. Having been thusly phase compensated, and given the appropriately adjusted decision thresholds as are also provided by the pilot filter, a decision can then be made as to which symbol has been received, and the detected symbol passed on for further processing as appropriate. Such processing would typically comprise, for example, combining detected symbols from different sub-channel receivers, and conversion to a serial format. The arrangement of FIGS. 15–28 offers an example of a digital receiver system using embedded time domain pilots to assist in the demodulation/detection process, according to the present invention, to provide substantial improvements of increased channel bandwidth and higher slot throughput with minimal impact on channel bit error rate.

Figure 2:
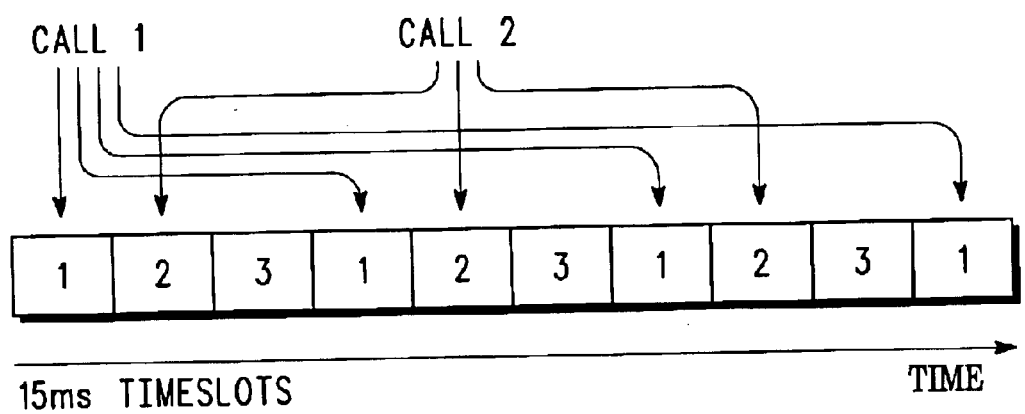
FIG. 2 is a schematic diagram of call assignments.

Referring to FIG. 2, an example of a 3:1 service is given, in which a user is allocated every third 15 millisecond time slot on a single frequency. As indicated, call 1 is assigned interleave 1 and call 2 is assigned interleave 2. Time slots are also available for a third user, call 3. Together, the interleaved time slots comprise a serial succession of time slots for a given channel, i.e., for a given frequency.

Each time slot in the system is comprised of four sub-carriers or sub-channels which carry digital modulation information. In this digital format both amplitude and phase modulation is carried out according to well known 16 QAM modulation on four sub-carriers. The frequency plan for MOTOROLA "iDEN" systems employs carrier numbers to designate channel frequencies. The relationships of carrier numbers to inbound and outbound frequencies are determined according to known relationships. In the system, phase and amplitude orthogonal axes Q, I define four quadrants each of which has a constellation of four modulation values or symbols. Included among the symbols, as will be seen herein are sync symbols, pilot symbols, data symbols, color code symbols and ACP symbols. Details concerning the 16 Quadrature Amplitude Modulation (QAM) system are given above with reference to FIGS. 15–28 and in U.S. Pat. No. 5,548,631 and 5,519,730, the disclosures of which are incorporated by reference as if fully set forth herein.

Figure 3:
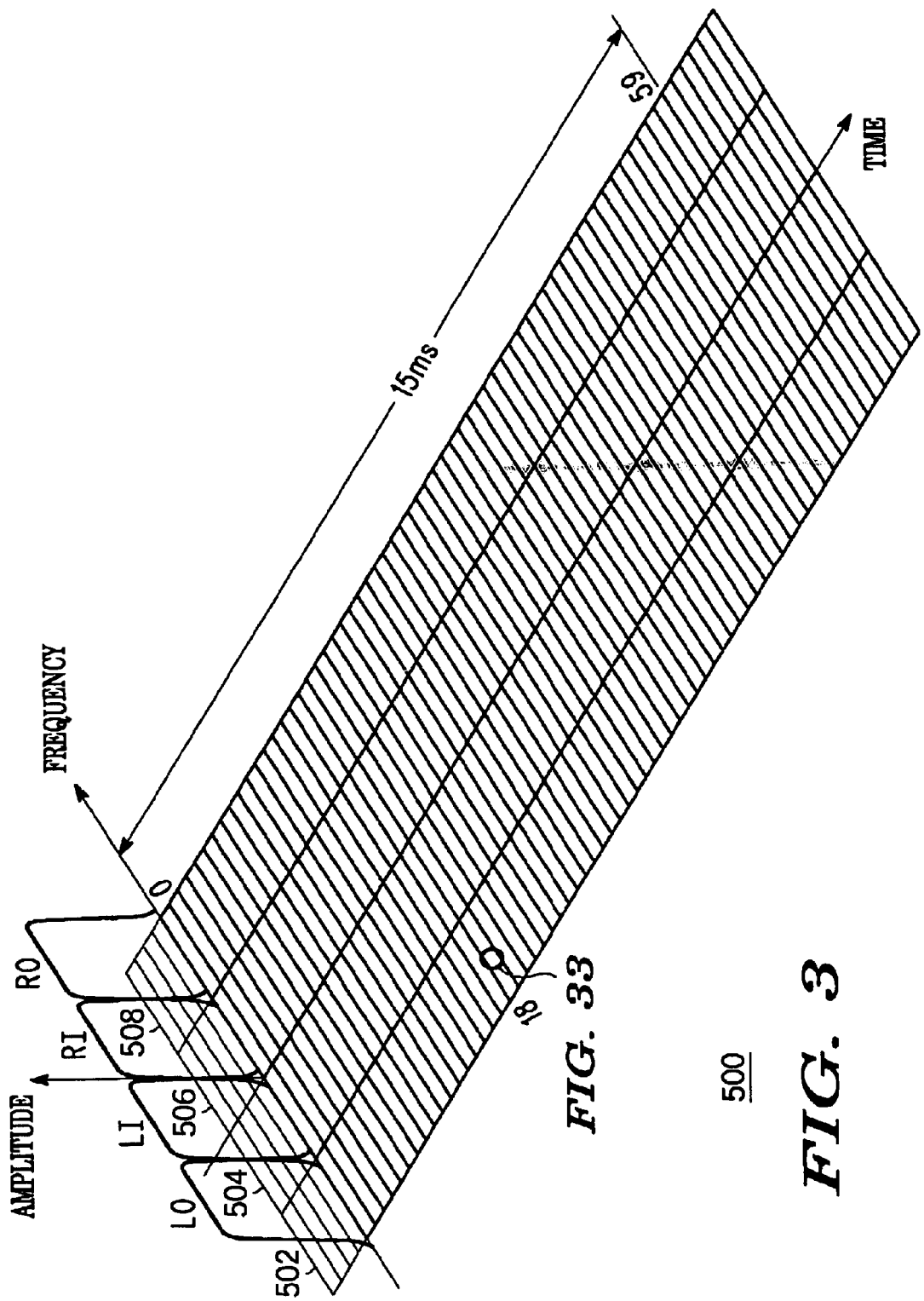
FIG. 3 is a three-dimensional schematic diagram of a full outbound slot format.

On each of the four sub-channels, digital symbols, i.e., wave forms that have precisely defined amplitude and phase are transmitted. Each symbol has 16 possible amplitude and phase combinations which convey four bits of information by mapping the 16 possible four-bit quantities to one of the 16 possible symbols. Symbols are transmitted at a rate of 4 kHz, so each symbol has a 250 microsecond duration. The actual transmission of symbol wave forms over-the-air is termed "physical layer" which makes up the raw transmission path that all other communication links ride upon. The outbound path generally refers to communication from the infrastructure or base station to the mobile or subscriber unit. Conversely, the inbound communication path refers to communications from the subscriber unit to the infrastructure. The data communicated is frequently referred to as payload, and the remaining necessary systems communications are referred to as overhead. Referring now to FIG. 3, a Full Outbound Slot is shown in a three-dimensional schematic diagram. In FIG. 3, a single, representative time slot 500 is shown comprised of four sub-channels 502, 504, 506, 508. In the example shown in FIG. 3, time slot 500 is divided into sixty divisions or symbol positions. Thus, in time slot 500, there are 240 symbol positions transmitted over the 15 millisecond interval. Conventionally, the four sub-channels or sub-carriers 502, 504, 506, 508 are designated Left Outer (LO), Left Inner (LI), Right Inner (RI) and Right Outer (RO). In FIG. 3, the sixty symbol positions are numbered 0 through 59. The X and Y axes are laid out for time and frequency, while the Z axis denotes amplitude. At symbol position 18 on the Left Outer sub-channel 502, a phase-amplitude (Q—I) diagram indicates a modulation value 512 in the upper right quadrant each of the symbol positions in the four sub-channels can assume any of the values of the phase-amplitude diagram 514 illustrated in FIG. 33.

Figure 4:
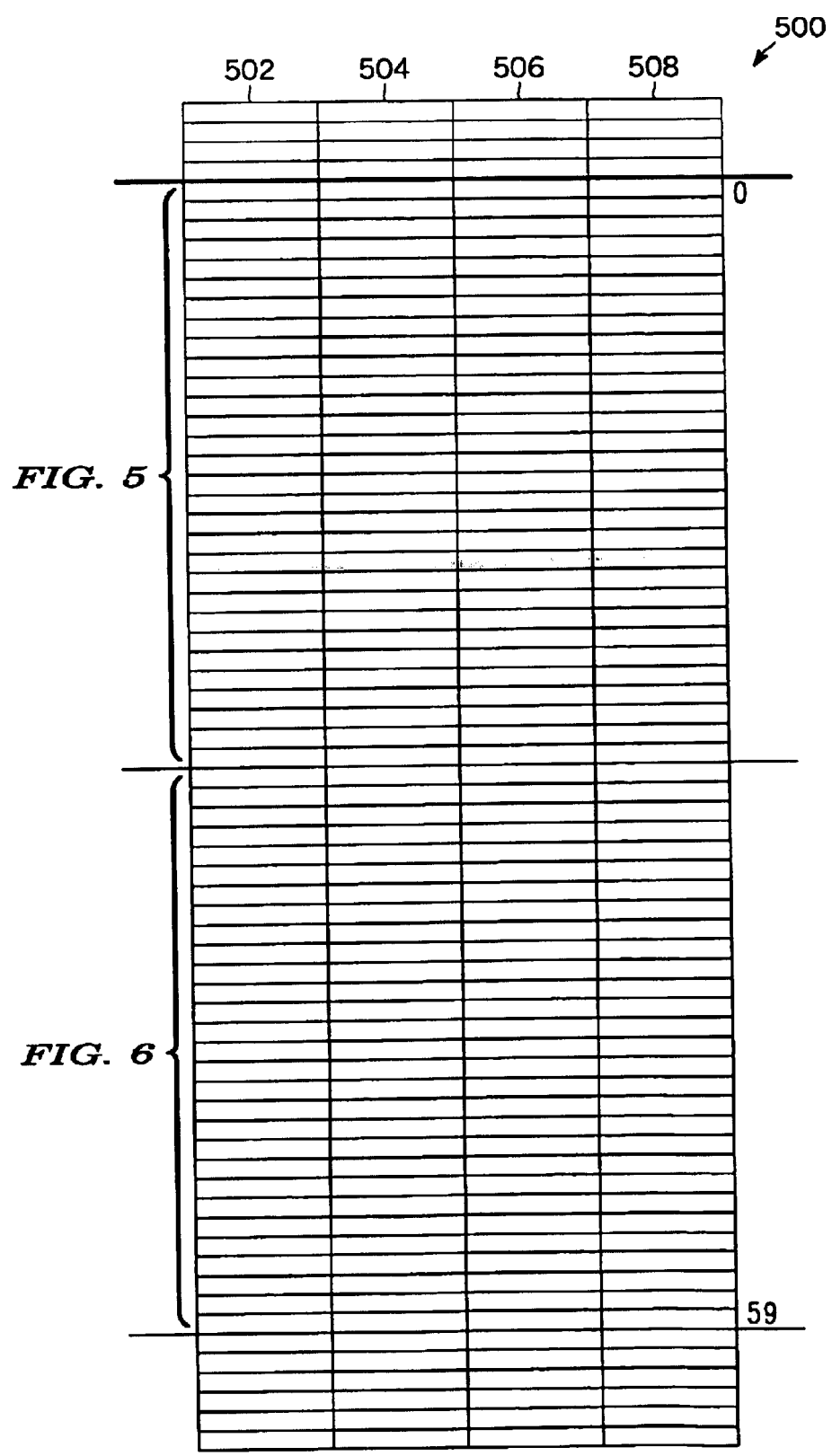
FIG. 4 is a top plan view thereof.

Referring to FIGS. 4–6, system assignment for the symbol positions is shown. FIG. 4 comprises a top plan view of the three-dimensional diagram of FIG. 3. FIGS. 5 and 6 together comprise the diagram of FIG. 4, taken on an enlarged scale. In the arrangement of FIG. 3, the first three symbol positions of the four sub-channels 502, 504, 506, 508 carry sync symbols 520, ACP symbols 522 are located adjacent the beginning and ending of time slot 500 in sub-channels 506 and 504, respectively. Color code symbols 524 are located immediately following the block of sync symbols at the beginning of sub-channels 502, 504. Color code symbols 524 are also located at the end of time slot 500, on sub-channels 506, 508. A plurality of pilot symbols 526 are spaced periodically along the sub-channels 502, 504, 506, 508. Each sub-channel has seven pilot symbols 526. The remaining symbol positions carry the payload of data symbols 530.

At the beginning of time slot 500, the first three symbols of each sub-channel makeup the sync wave form. Each symbol position in this block carries a sync symbol 520. The sync symbol block in symbol positions 0–2 of the four sub-channels are provided to allow the receiver to lock onto the time slot and to provide timing information to decode the remaining time slot symbols. The pilot symbols 526 spaced throughout the time slot are used to combat the effects of fading. The color code symbols 524 have 16 possible combinations and are assigned so that the closest cellular areas which were used frequencies are assigned different color codes, a measure to prevent cross talk arising from co-channel interference. The color code symbols 524 are inserted in the time slot so that, with a high probability, another interfering signal will have a different color code value and thus can be differentiated. The receiver discards or rejects the time slot having a different color code value so that the interfering payload (e.g., data symbols carrying audio) will not be inserted into the call. The ACP symbols are Associated Control Procedure symbols dedicated to secondary types of control communications.

Figure 33:
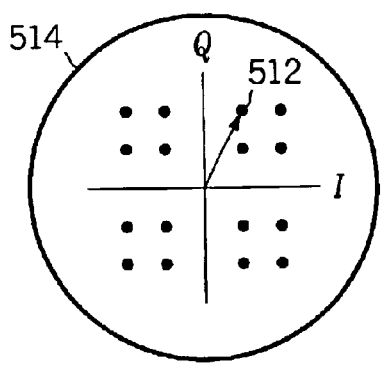
FIG. 33 shows a portion of FIG. 3 taken on an enlarged scale.

As indicated in diagram 514 in FIG. 33, each symbol resides on a constellation which is a phase/amplitude plot where the real axis represents the in-phase portion of the wave form and the imaginary axis represents the quadrature component. These combinations or constellation values define the 16 possible symbol values at every location.

Figure 7:
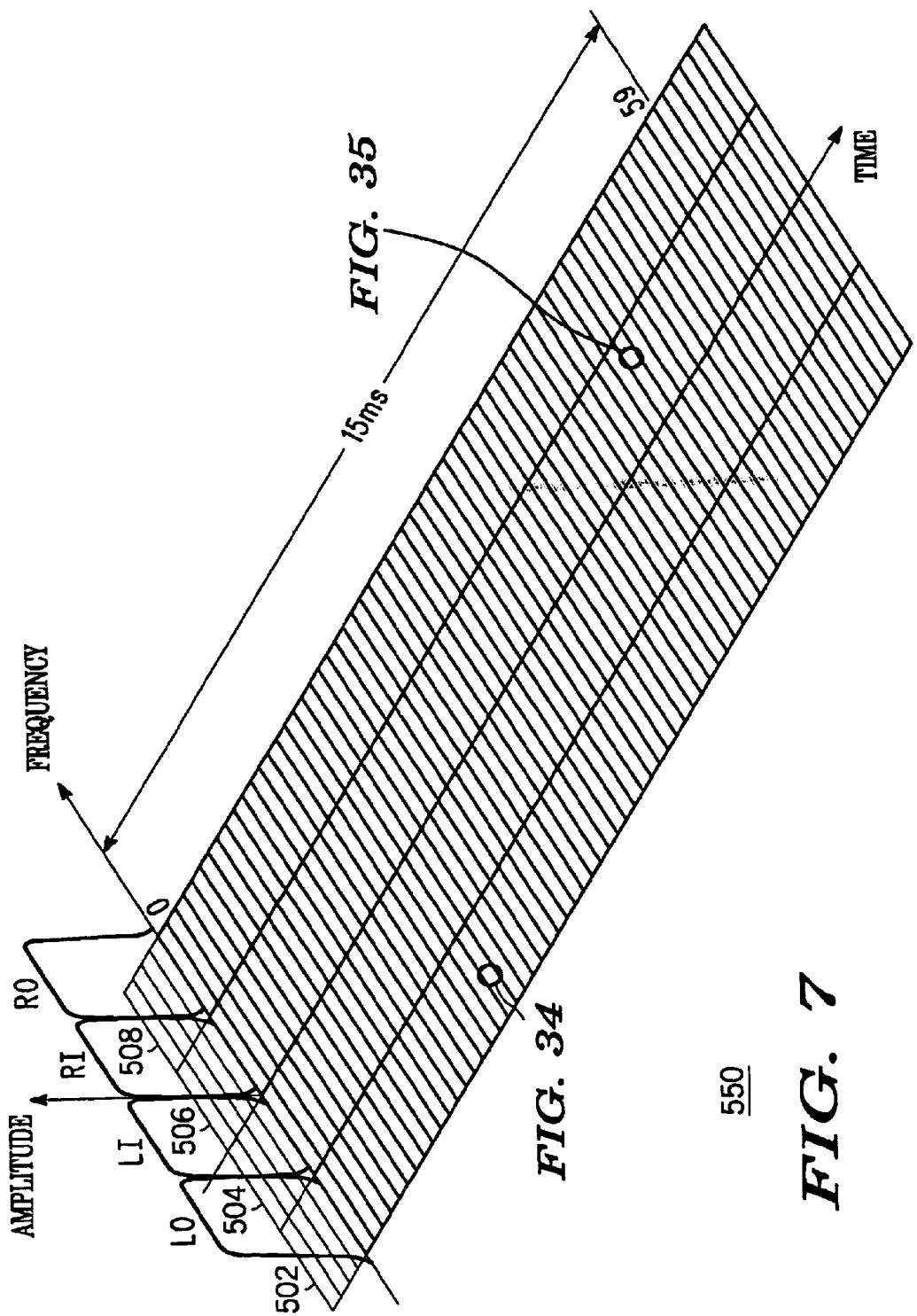
FIG. 7 is a three-dimensional diagram showing a split outbound slot format.
Figure 8:
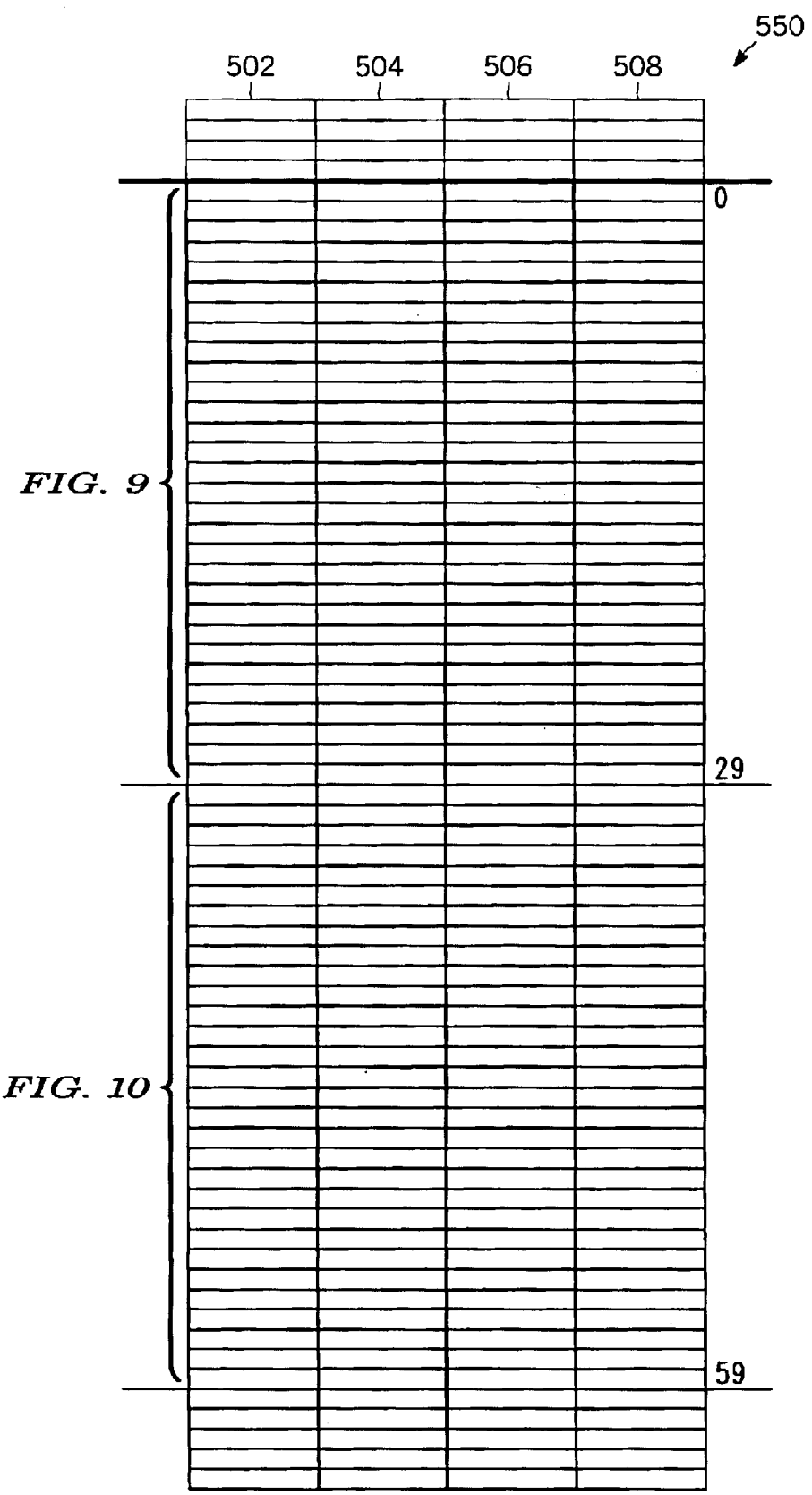
FIG. 8 is a top plan view thereof.
Figure 9:
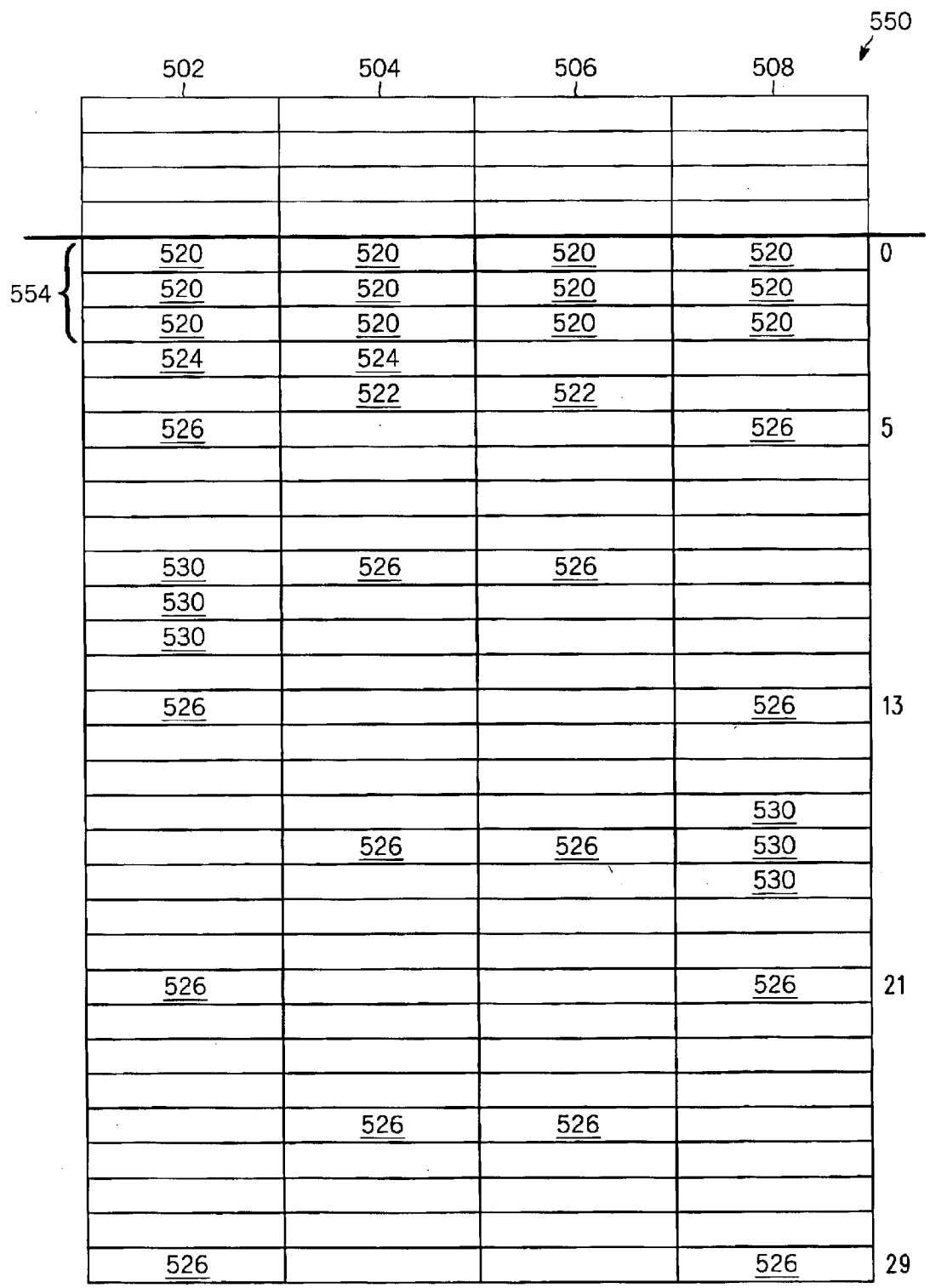
FIGS. 9 and 10 together comprise a top plan view thereof taken on an enlarged scale.
Figure 10:
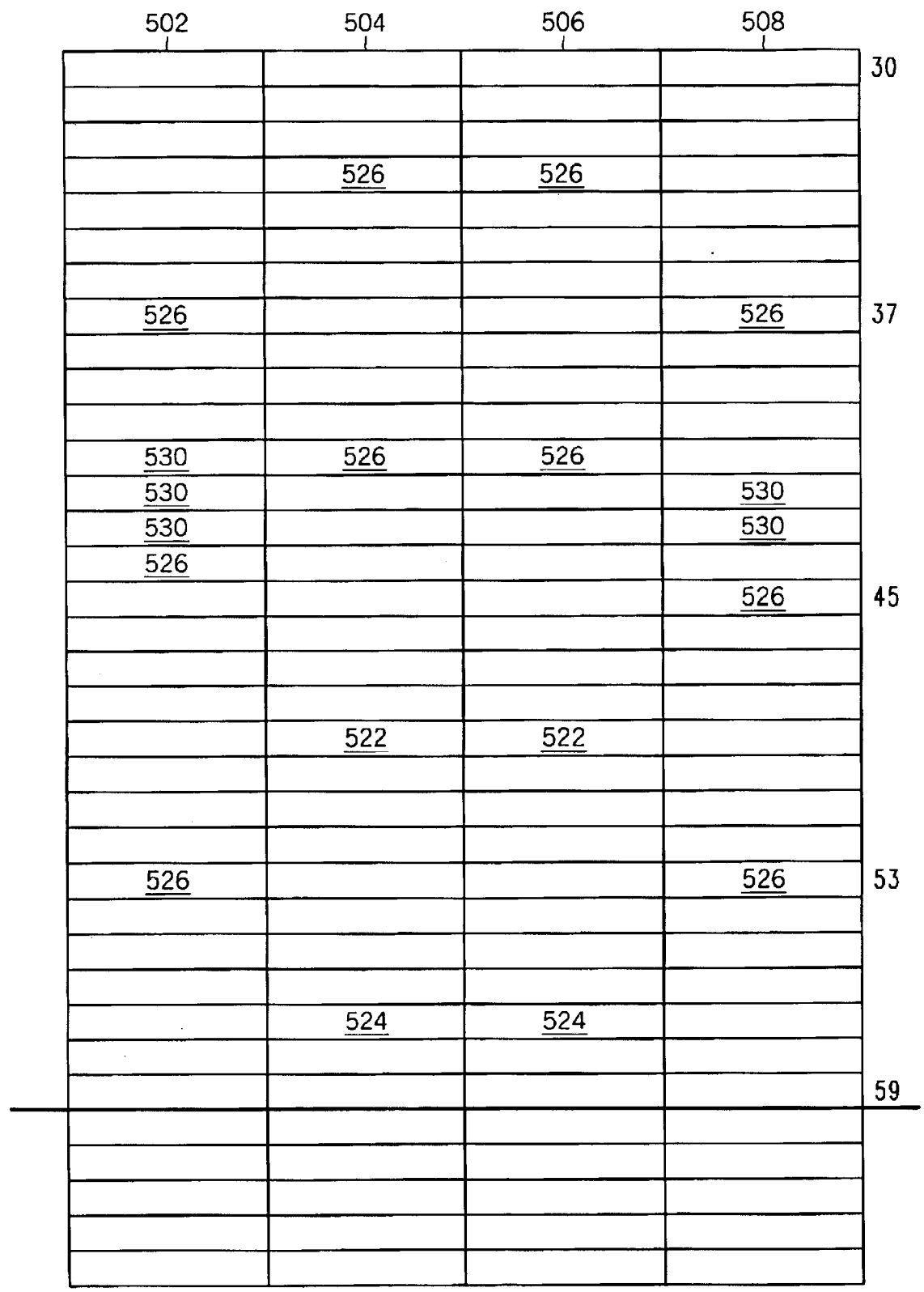
Figure 34:
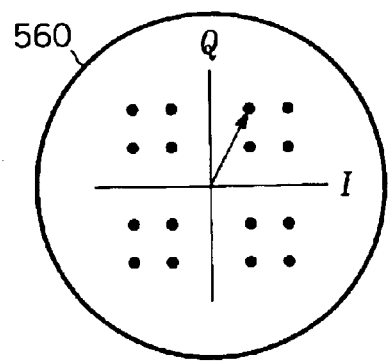
FIGS. 34 and 35 show portions of FIG. 7 taken on an enlarged scale.
Figure 35:
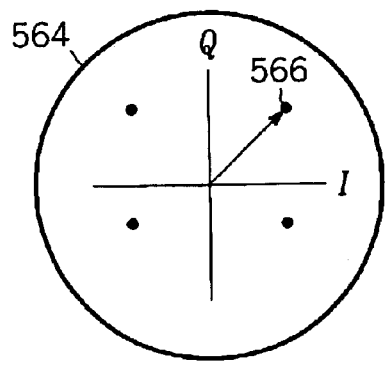
Figure 36:
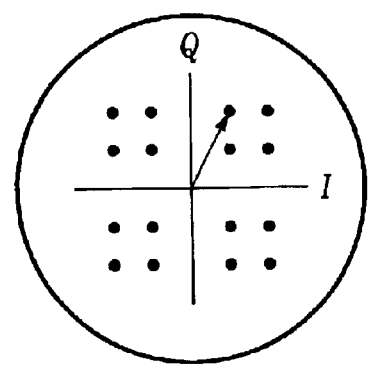

Referring now to FIG. 7, a split outbound time slot 550 is shown. As in the preceding format, time slot 550 is divided into four sub-channels 502 504, 506, 508 and sixty time divisions or symbol positions numbered 0–59. FIG. 8 represents a top plan view of the three-dimensional diagram of FIG. 7 and FIGS. 9 and 10 together comprise diagram of FIG. 8, taken on an enlarged scale. As in the preceding time slot format, time slot 550 begins with three symbol positions 0–2 in each of the four sub-channels 502, 504, 506, 508. ACP symbols 522 are located in symbol position 4 of Left Inner sub-channel 506 and Right Inner sub-channel 508 and in symbol position 49 in the same sub-channels 506, 508. Color code symbols are located in the Left Outer and Left Inner sub-channels 502, 504 immediately following the sync block 554 and are located adjacent the end of time slot 550 in symbol position 57 of sub-channels 504, 506. Pilot symbols 526 are spaced throughout each sub-channel with seven pilot symbols being provided in the Outer sub-channels 502, 508 and five pilot symbols in the Inner sub-channels 504, 506. Referring to FIGS. 34 and 35, diagram 560 indicates a data value in one symbol position of sub-channel 502, while diagram 564 indicates a value 566 of an ACP symbol in sub-channel 506. The remaining symbol positions contain payload of data symbols 530 which are sent to two different users.

Figures 11, 36:
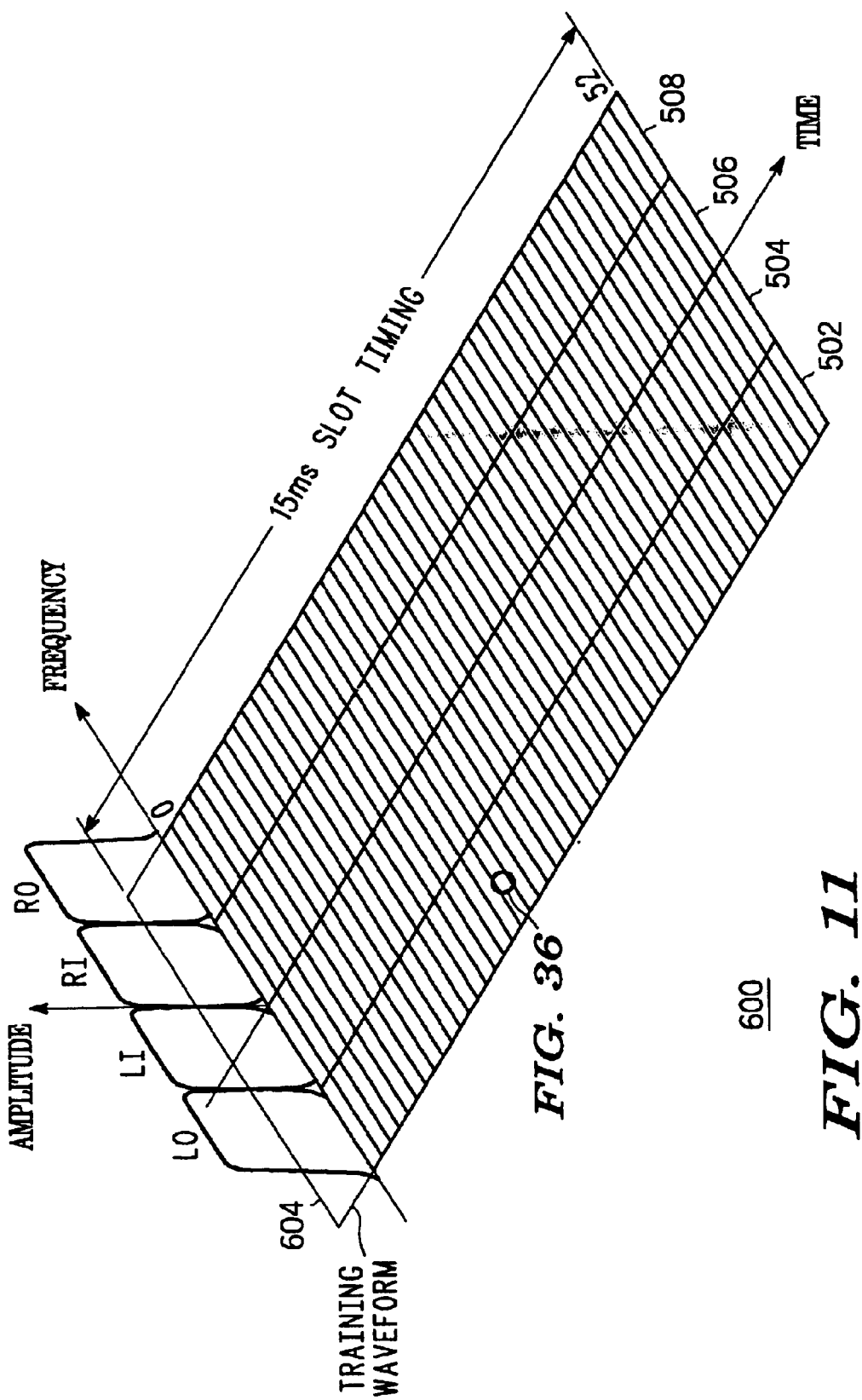
FIG. 11 is a three-dimensional schematic diagram of a full reserved inbound access slot format.
FIG. 36 shows portion of FIG. 11 taken on an enlarged scale.
Figure 12:
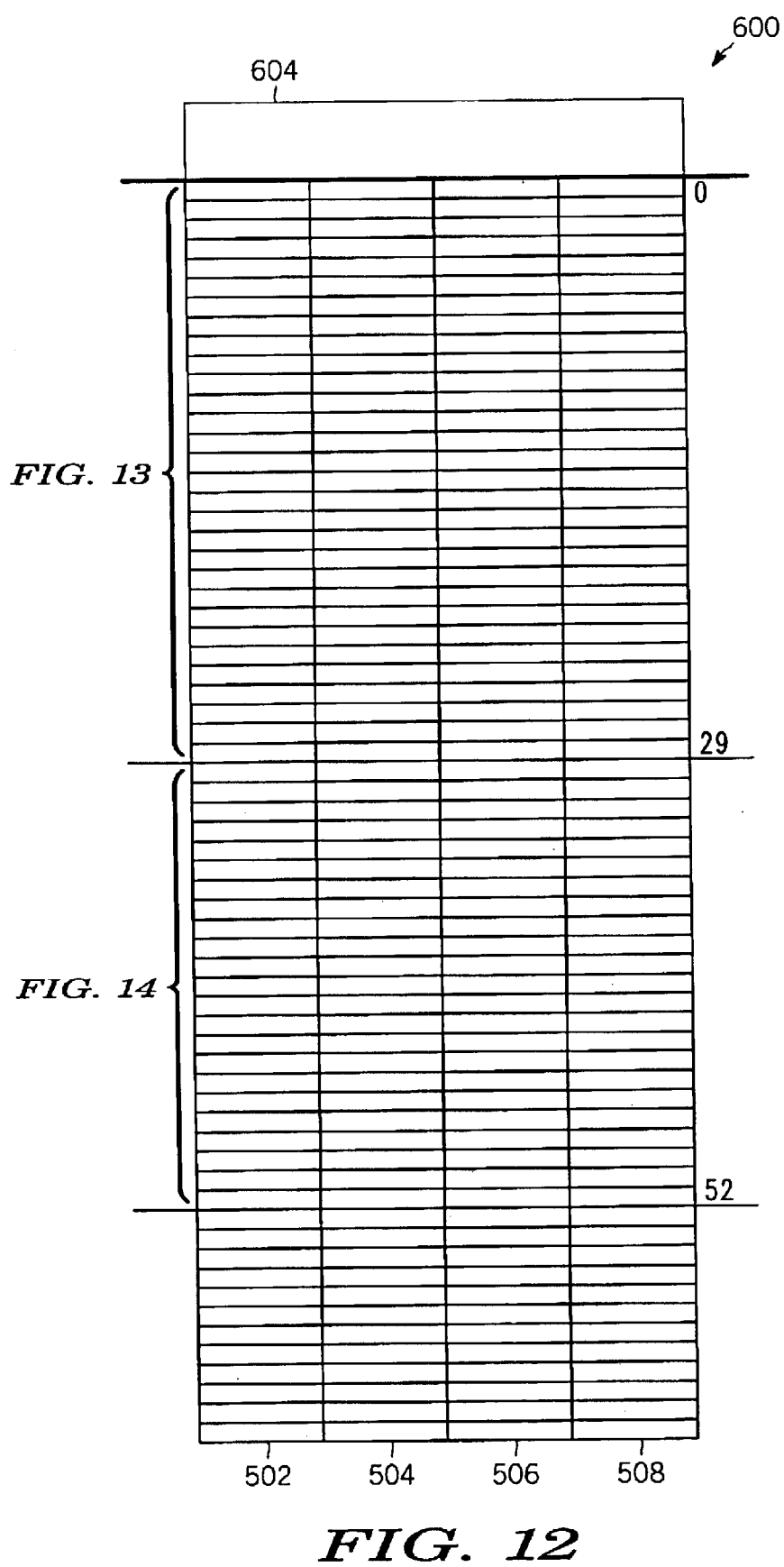
FIG. 12 is a top plan view thereof.
Figure 13:
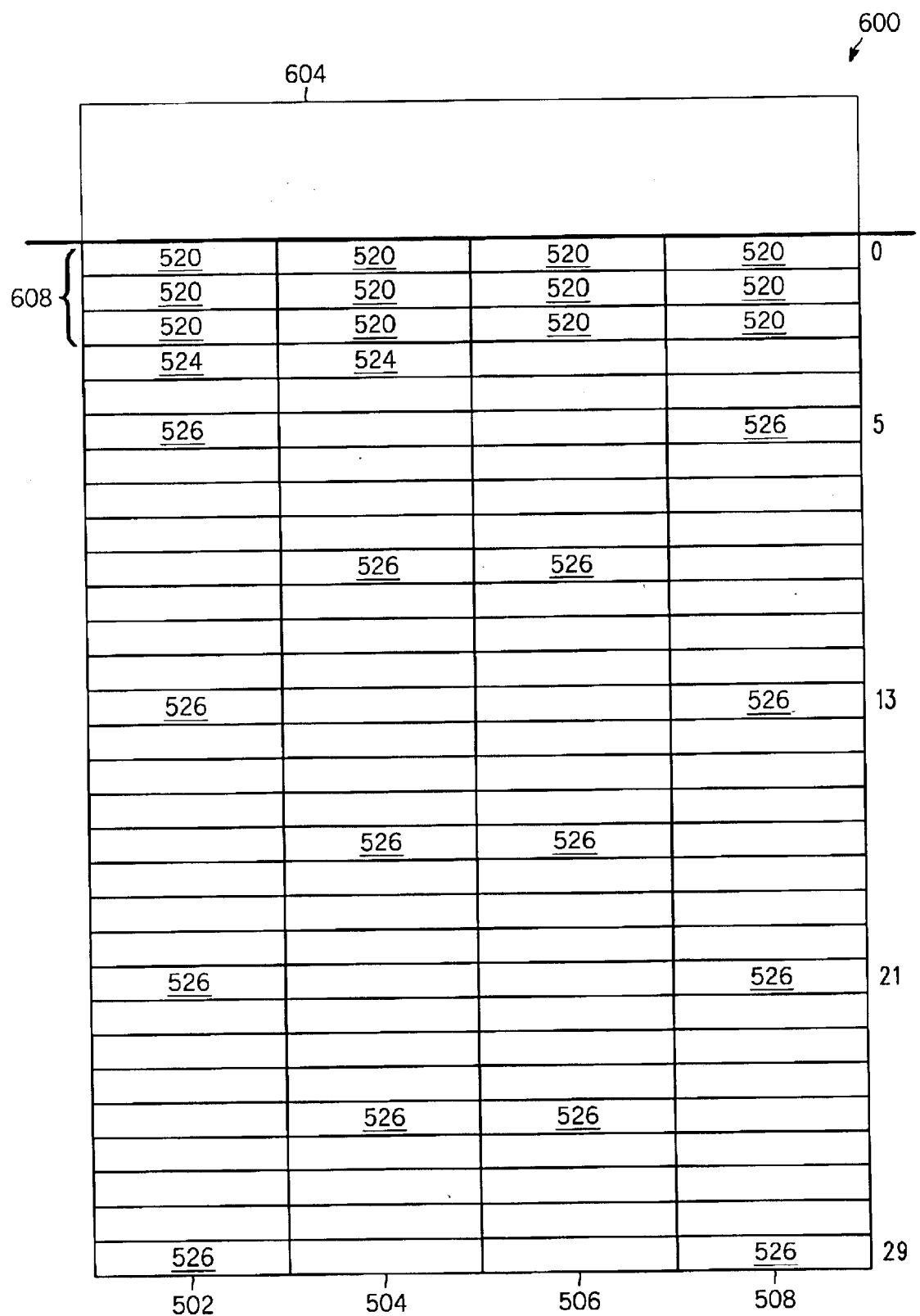
FIGS. 13 and 14 together comprise a top plan view thereof, taken on an enlarged scale.
Figure 14:
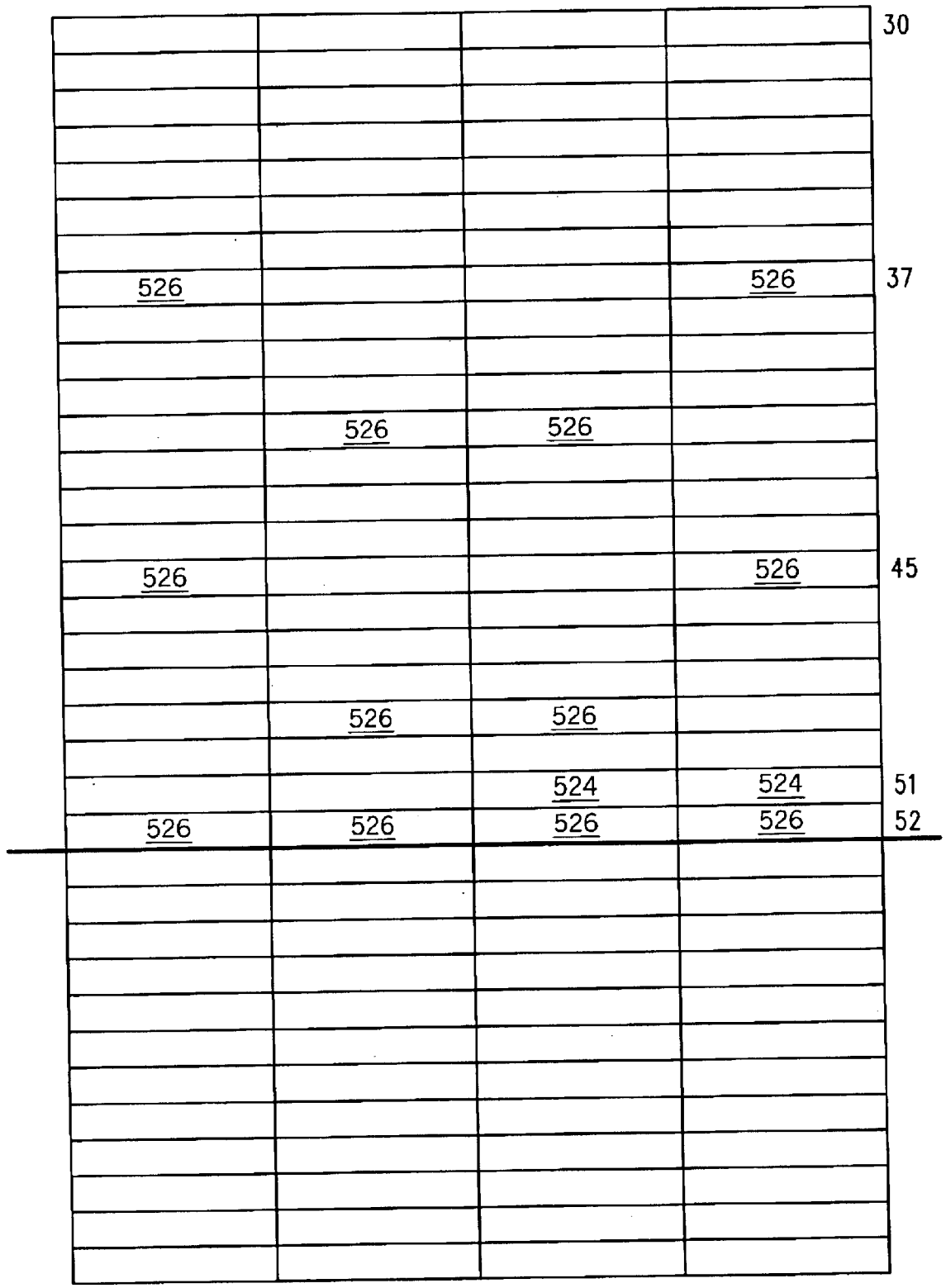

Referring now to FIG. 11, a full reserved inbound time slot is indicated at 600. Time slot 600 is comprises of four sub-channels 502, 504, 506, 508 and has a 15 millisecond duration with a training wave form 604 and fifty-three symbol positions 0–52. FIG. 12 comprises a top plan view of the three-dimensional diagram of FIG. 11 and FIGS. 13 and 14 together comprise the diagram of FIG. 12 taken on enlarged scale. Immediately following training wave form 604, symbol positions 0–2 in each sub-channel 502–508 carry a sync symbol 520. Color code symbols 524 immediately follow the sync block 608 in sub-channels 502, 504 and are located in sub-channels 506, 508 immediately adjacent the end of the time slot, in symbol position 51. As in the preceding formats, each sub-channel comprises a spaced series of pilot symbols 526 with each sub-channel 502 504, 506, 508 having seven pilot symbols.

The full outbound slot described in FIGS. 3–6, the split outbound slot described with reference to FIGS. 7–10 and the full reserved inbound slot described with reference to FIGS. 11–14 comprise examples of digital receiver systems which employ embedded time-domain pilots which can be readily adapted to receive benefit from the present invention, comprising increased channel bandwidth and higher throughput, without substantially affecting channel bit error rate.

Figure 29:
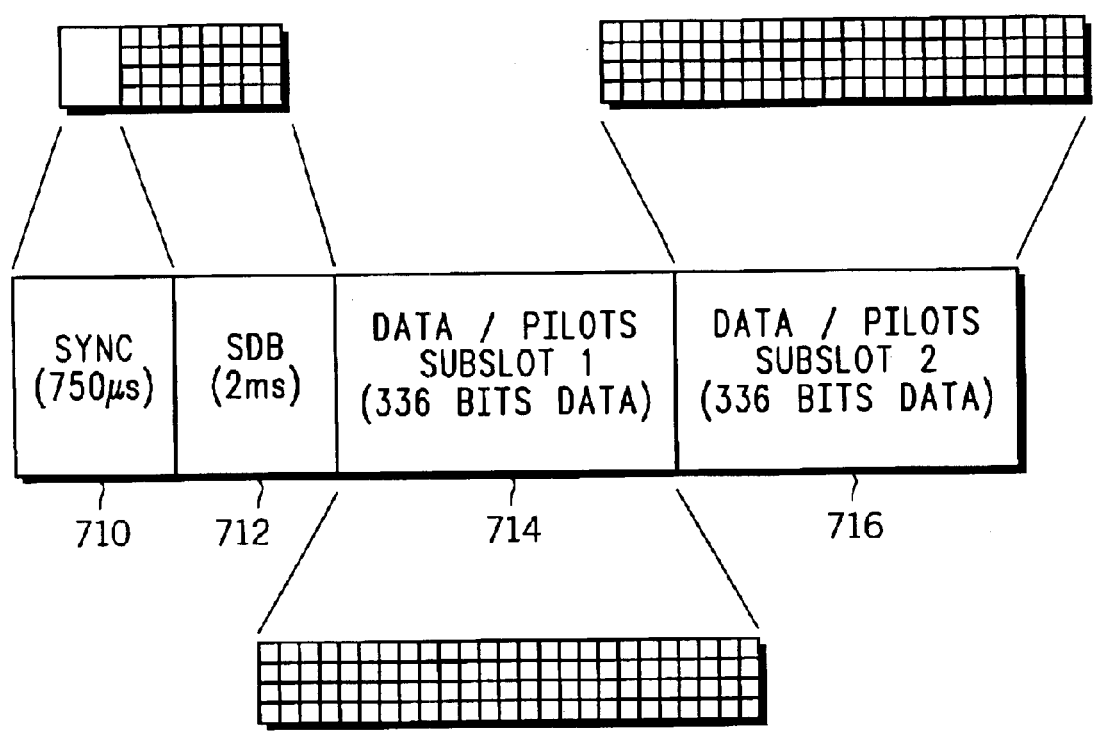
FIG. 29 is a schematic diagram of a timing sub-slot format.
Figure 30:
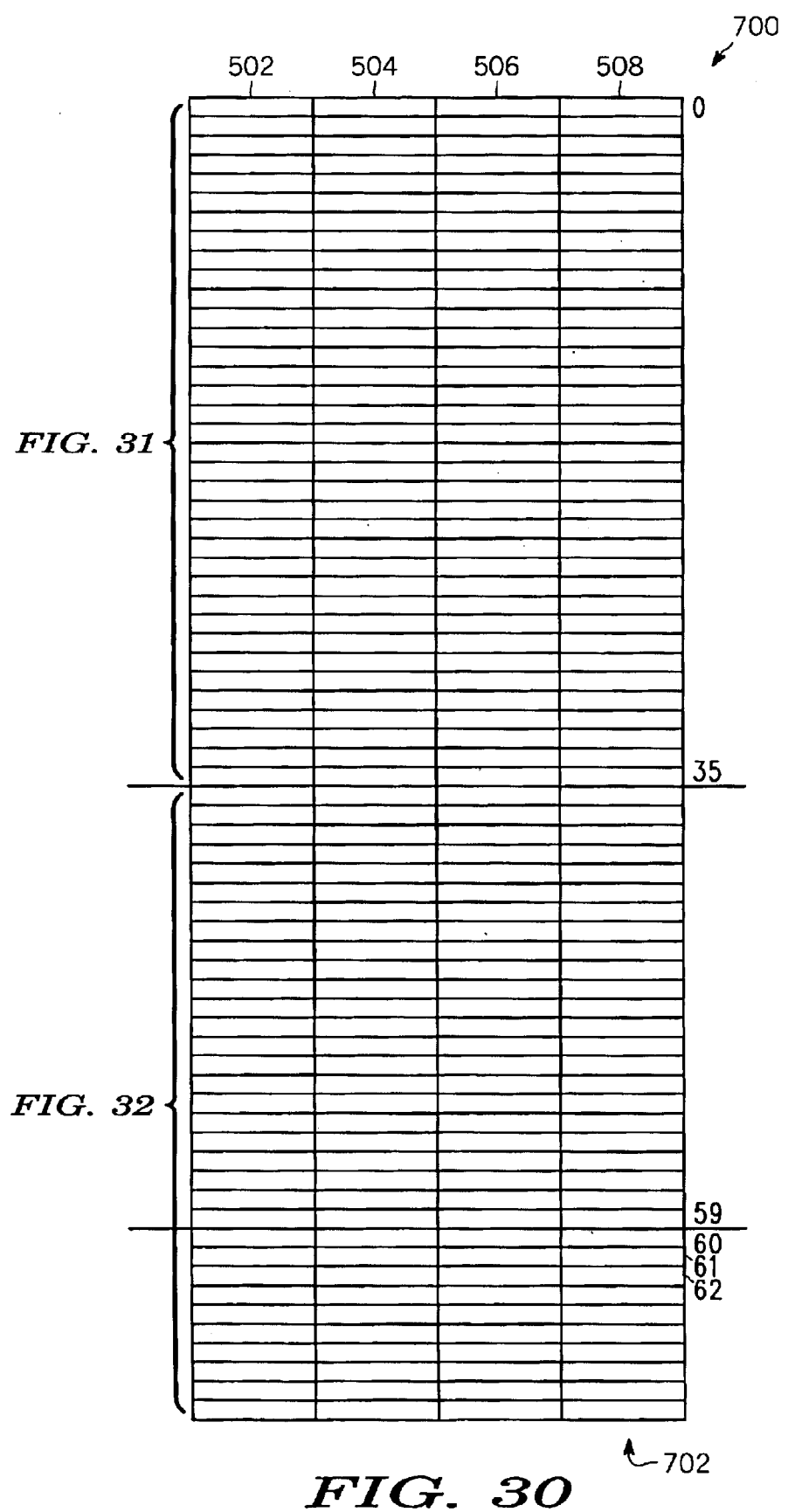
FIG. 30 shows the format of FIG. 29 in a linear, schematic presentation.

Turning now to FIGS. 29–32 a digital time division multiple access communication system with a time slot format 700 is shown. As in the preceding arrangements, time slot format 700 comprises four quadrature amplitude modulation sub-channels or sub-carriers comprising left outer and left inner sub-channels 502, 504 and right inner, right outer sub-channels 506, 508. In the arrangement of FIG. 30, time slot 700 is divided into sixty divisions, or symbol positions 0–59. Also shown in FIG. 30 is the beginning portion of a second, identical time slot identified by reference numeral 702. Together, FIGS. 31 and 32 comprise the diagram of FIG. 30 taken on an enlarged scale.

FIG. 29 shows the time slot, is divided into block portions 710, 712, 714, 716. In block 710 sync symbols occupy all of the available symbol positions, and extend over the first 750 microseconds of the 15 millisecond time slot. In terms of the diagram of FIG. 30, the sync bits of block 710 occupy the first three rows of symbol positions, 0–2, in each of the four sub-channels. The sync symbols are identified by reference numeral 720 (see FIG. 31).

In the second block 712 shown in FIG. 29, the SDB portion occupies 2 milliseconds of the time slot, symbol positions 3–10. This section comprises pilot symbols 724 in symbol position 5 of the left outer and right outer sub-channels 502, 508; and symbol position 9 in the left inner and right inner sub-channels 504, 506. The remaining symbol positions are filled with data symbols.

Figure 31:
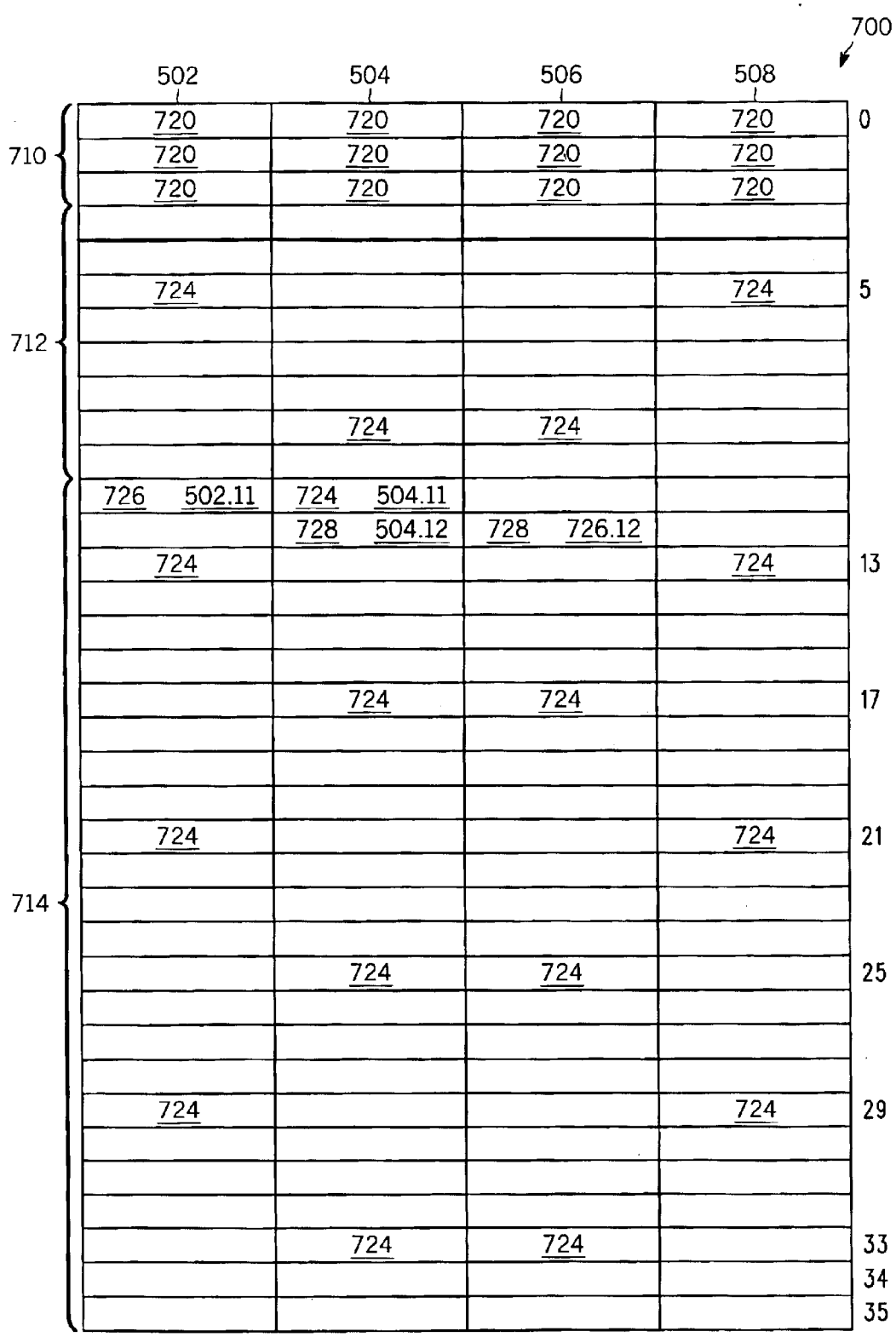
FIGS. 31 and 32 together comprise the format of FIG. 30 taken on an enlarged scale.

Block 714, as shown in FIG. 29, is referred to as "sub-slot 1" and contains 336 bits of data and data symbols, and also comprises pilot symbols 724. Sub-slot 1 occupies symbol positions 11–35, as shown in FIG. 31. Included in this block portion are color code symbols 726 in symbol position 11 of left outer and left inner channels 502, 504. Immediately following, in symbol position 12 of left inner and right inner sub-channels 504, 506 are ACP Steal Codes 728. As can be seen in FIG. 31, a spaced series of pilot symbols 724 are located throughout block portion 714, being arranged in a pre-selected pilot symbol format.

Figure 32:
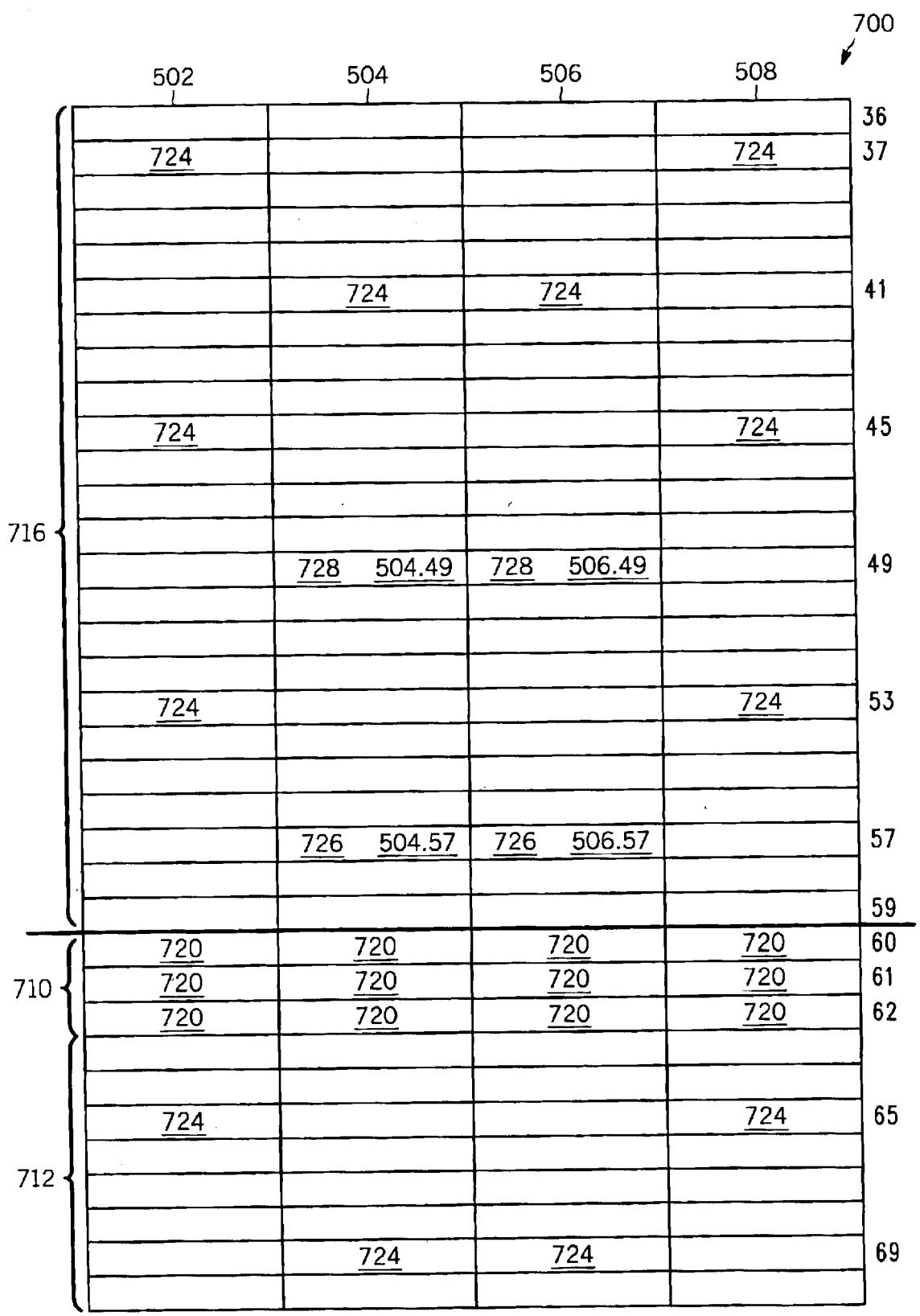

Referring again to FIG. 29, block 716 is referred to as "sub-slot 2" and occupies symbol positions 36-59 of time slot 700, carrying 336 bits of data. ACP Steal Codes 728 are located in symbol position 49 of the left inner and right inner sub-channels 504, 506. Color code symbol 726 is located in symbol position 57 of the left inner and right inner sub-channels 504, 506, respectively. As shown in FIG. 32, spaced apart pilot symbols 724 are located throughout block 716, again arranged in a pre-selected pilot symbol format complementing the format of block portion 714 and cooperating therewith to form a regularly spaced two-dimension array of pilot symbol positions, each filled with respective pilot symbols, including derived pilot symbols.

At the bottom of FIG. 32, an initial portion of a consecutive time slot 702 is shown. Included are block portions 710 and 712, identical to those block portions described above at the upper portion of FIG. 31.

Four pilot symbols 724 are located, in the second block 712 two at symbol position 5 of the outer sub-channels and two at symbol position 9 of the inner sub-channels. The remaining, unmarked symbol positions in block 712, which extend between symbol positions 3 and 10, are filled with SDB symbols.

By employing a decoding method according to principles of the present invention throughput of the time slot is expanded using decision-directed pilots. As is known in certain TDMA digital communication systems, defined symbol pilots are transmitted in a sub-channel to allow the receiver to reduce the effects of fading and to decode receive symbols correctly. As can be seen in FIGS. 29–32, dedicated pilot symbols are employed throughout the time slot 700 (see FIG. 29). These pilot symbols are used to carry out conventional less rigorous pilot interpolation. Typically, less rigorous pilot interpolation of data symbols employs a relatively small number of pilots (e.g., five dedicated pilot symbols surrounding the data symbol and three additional pilot symbols in an adjacent sub-channel). Using pilot interpolation techniques in this manner, gain effects (e.g., fading) can be interpolated for the data symbol of interest.

As indicated in FIG. 32, for example, dedicated pilot symbols are missing, according to the pilot symbol pattern evident in the remainder of the slot format. Specifically, dedicated pilot symbols are missing at positions 504.57 (i.e., position 57 in sub-channel 504) and position 506.57. In place of dedicated pilot symbols, so-called dual purpose symbols are located at various pilot symbol positions in the time slot format. The dual purpose symbols are located in pilot symbol positions according to the pre-selected pilot symbol format. As will be seen herein, the dual purpose symbols have one purpose of providing derived pilot symbols in addition to other, unrelated slot format information. For example, color code symbols 726 are placed at dedicated pilot symbol positions, rather than dedicated pilot symbol 724. In a similar manner, ACP symbols 728 appear in regular, dedicated pilot symbol positions 504.49 and 506.49. Data interpolation techniques are applied to these four substitute or "dual purpose" symbols (i.e., the two color code symbols 726 at position 57 and the two ACP symbols at position 49). However, according to one aspect of the present invention, more rigorous pilot interpolation techniques are applied to these four dual purpose symbols, as opposed to the preferred pilot interpolation techniques applied to the data symbols.

In the preferred embodiment, all of the available dedicated pilot symbols of the time slot are employed for rigorous pilot interpolation of these dual purpose symbols in addition to six sync symbols for each dual purpose symbol. For example, the color code symbol 726 in position 506.57 undergoes pilot interpolation using all of the available dedicated pilot symbols in the slot containing the color code symbol, in addition to the three sync symbols in the same sub-channel (i.e., sub-channel 506) at the beginning of the slot of interest (i.e., sync symbols 720 in positions 506.0, 506.1 and 506.2). Further, pilot interpolation of color code symbol 726 in position 506.57 utilizes three sync symbols 720 in the same sub-channel 506 just beyond the slot of interest, i.e., positions 506.60, 506.61 and 506.62. As mentioned, position 60 begins a new slot and with reference to the new slot has a relative position zero. However, for purposes of description of the full slot shown in the figures, position zero of slot two is also identified as position number 60 relative to slot one. The ACP symbol 728 in position 506.49 undergoes pilot interpolation using the same resources as for color code 726 in position 506.57, which is located in the same sub-channel. In a similar manner, color code 726 in position 504.57 undergoes pilot interpolation utilizing all of the available dedicated pilot symbols, the first three sync symbols 720 in the same sub-channel (i.e., positions 504.0, 504.1 and 504.2) and the three sync symbols in the same sub-channel immediately following the slot of interest (i.e., sync symbols 720 in positions 504.60, 504.61 and 504.62). The ACP symbol 728 in position 504.49 undergoes pilot interpolation using the same resources as those employed for color code 726 in position 504.57.

The symbols located in the slot shown in FIGS. 29–32 are all modulated, as would be expected. However, according to certain aspects of the present invention, repeated, dual purpose symbols (i.e., those symbols in positions 504.49, 506.49, 504.57, and 506.57) are modulated with a lower order modulation than the data symbols in the slot, which are modulated with a higher order modulation than the copied or repeat dual purpose symbols. In the preferred embodiment, the remaining symbols of slot 700 (e.g., the sync symbols 720, color code symbols in position 11 and ACP symbols 728 in position 12) are also modulated according to the higher order modulation employed. In the preferred embodiment, lower order modulation comprises conventional QPSK, while the higher order modulation comprises 16-QAM modulation. The present invention also contemplates other examples of novel lower order and higher order modulation. Several types of modulated data occupy lower-order modulation symbols. These lower-order modulation symbols are placed on pilot symbols throughout the time slot, thus assigning a combined task of transmitting data while providing pilot information. By placing lower-order modulation symbols on assigned pilot symbols, known techniques utilizing surrounding pilots for decoding now operate on lower-order modulation symbols, resulting in more reliable decoding for a given C/I ratio.

In the preferred embodiment, lower order modulation symbols are carried in the aforementioned dual purpose symbols at positions 49 and 57 of sub-channels 504 and 506. In general, the lower-order modulation symbols, are demodulated, combined using known max-ratio techniques, and then decoded. The decoded lower-order modulation symbols are then used as pilots for the next higher order modulation symbols contained in the same and/or adjacent time slots. If desired, this process could be repeated for additional levels of still higher-order modulations, although only two levels of iteration have been found necessary in carrying out the present invention.

It is preferred in carrying out the practical embodiment of the present invention that the repeated, dual purpose color code symbols in positions 504.57 and 506.57 are operated upon first, before similar operations are carried out on the repeated, dual purpose ACP symbols at positions 504.49 and 506.49. In particular, the repeated, dual purpose color code symbols in positions 504.57 and 506.57 are demodulated (utilizing lower order demodulation techniques) and are then subjected to the more rigorous pilot interpolation techniques as described above, since these symbols will function as pilot symbols within the slot format. The repeated, dual purpose color code symbols are then max-ratio combined, as will be described below and are then detected. The detected symbols are then used as pilots ("derived pilot symbols") in positions 504.57 and 506.57 for pilot interpolation of data contained in slot 700. The process is then repeated for the repeated or copied dual purpose ACP symbols in positions 504.49 and 506.49. The ACP symbols 728 in these positions are demodulated according to lower order demodulation techniques, are pilot interpolated, max-ratio combined and detected. The detected symbols are then used as ("derived") pilots in the ACP positions 504.49 and 506.49 for pilot interpolation of data in slot 700. Thus, utilizing principles of the present invention, four symbols of overhead are saved for data usage, thus increasing slot throughput. The bit error rate penalty for the throughput gain has been found to be negligible.

As mentioned above, the dual purpose symbols of interest are "repeated" or copied. That is, the color code symbols 726 in positions 504.57 and 506.57 are repetitions, i.e., copies of the color code symbols 726 located earlier in the slot, at positions 502.11 and 504.11. In a similar manner, the ACP symbol 728 in positions 504.49 and 506.49 are copies or repetitions of the ACP symbols 728 in positions 504.12 and 506.12. It is generally preferred that the dual purpose symbols are repeated as contiguous, side-by-side pairs and have the order of the pairs remains the same throughout slot 700. That is, the lowest symbol 726 at position 502.11 is repeated at 504.57 the bottom symbol 726 of the inner pair in position 57 (called cc3 in pseudo code below where $cc3_{-1}$ is the symbol at position 502.11 and $cc3_{-2}$ is the symbol 504.57 at position 57) and the second symbol from the bottom at 504.11 position 11 is repeated at 506.57 the third symbol from the bottom in position 57 (called cc4 in pseudo code below).

CSI is the decision threshold in either the real or imaginary planes. For example if all the points reside on ([+−1,+−3], [+−1,+−3]) the CSI would be 2. (zero is another decision threshold as well).

Channel gain is defined at each symbol:

rx symbol=tx symbol*channel gain.

To negate the effects of channel gain we divide by the estimated channel gain to get back the estimated tx symbol. CSI is then: channel gain*conj (channel gain) for normal detection.

For max-ratio detection CSI(max-ratio) is:
channel gain first symbol*conj(channel gain first symbol)+channel gain second symbol*conj(channel gain second symbol).

$csi3 = ch\_gain\_cc3\_1$ (726@502.11) $conj(ch\_gain\_cc3\_1) + ch\_gain\_cc3\_2$ (504.57) $*conj(ch\_gain\_cc3\_2)$ $csi4 = ch\_gain\_cc4\_1$ (504.11)$*conj(ch\_gain\_cc4\_1) + ch\_gain\_cc4\_2$ (506.57)$*conj(ch\_gain\_cc4\_2)$ Once the color code symbols are combined, they are then decoded to determine the constellation points (in this case 4 points not 16 because the color codes are sent as LOM QPSK, lower than the 16QAM) used for the data.

The following are two examples of Max-Ratio Combination of Color Codes:

```
max_ratioCC3 = (cc3_1*conj(ch_gain_cc3_1) +
    cc3_2*conj(ch_gain_cc3_2))/csi3
max_ratioCC4 = (cc4_1*conj(ch_gain_cc4_1) +
    lcc4_2*conj(ch_gain_cc4_2))/csi4
```

The following is an example of Decoding of color code CC3:

```
decoded_CC3 = 0;
    if (real(max_ratioCC3) > 0) decoded_CC3 =
decoded_CC3 + 3;
        else decoded_CC3 = decoded_CC3 − 3;
    end
    if (imag(max_ratioCC3) > 0) decoded_CC3 =
decoded_CC3 + 3*j;
        else decoded_CC3 = decoded_CC3 − 3*j;
    end
```

The following is a routine to decode color code CC4:

```
decoded_CC4 = 0;
    if (real(max_ratioCC3) > 0) decoded_CC4 =
decoded_CC4 + 3;
        else decoded_CC4 = decoded_CC4 − 3;
    end
    if (imag(max_ratioCC4) > 0) decoded_CC4 =
decoded_CC4 + 3*j;
        else decoded_CC4 = decoded_CC4 − 3*j;
    end.
```

As mentioned above, two different techniques are employed in the present invention to improve throughput and reduce slot overhead. The first technique comprises the use of a lower order modulation for dual purpose symbols and the second technique employs repeating or copying previous dedicated symbols in the same slot, to provide content for the dual purpose symbols. In the description above, both techniques are employed. However, according to certain aspects of the present invention these two techniques do not need to be used together, and can be used apart from one another. For example, when the first technique of lower order modulation is employed, the dual purpose symbols do not contain repetitions of earlier positions located in the same slot. Accordingly, the max-ratio combination step is not employed. The dual purpose symbols are demodulated according to lower order modulation techniques, are pilot interpolated using the rigorous pilot interpolation techniques described above and are detected. Again, it is preferred that the color code symbols at position 59 are processed prior to the ACP symbols in position 49. The detected symbols which are processed in an initial stage preferably comprise the color code symbols in position 59, and the detected symbols are used as pilots in those positions. The ACP symbols in position 49 are then processed in a similar manner.

As an alternative, the present invention contemplates dual purpose symbols which have repeated values, comprising repetitions of dedicated symbols located earlier in the same slot, which is formed without utilizing different orders of modulation. In this alternative arrangement, the color code symbols and ACP symbols in positions 11 and 12 are replaced with data symbols, further increasing slot throughput. It is generally preferred that the color code symbols in position 59 are processed first, with the ACP symbol in position 49 being processed second.

As mentioned above, the present invention can be readily employed to improve virtually any digital receiver system which uses embedded time domain pilots to assist in the demodulation/detection process. Included, for example, are the full outbound slot described with reference to FIGS. 3–6, the split outbound slot described with reference to FIGS. 7–10 and the full reserved inbound slot described with reference to FIGS. 11–14. For example, in the full outbound slot 500 described with reference to FIGS. 3–6, dedicated pilot symbols 526 appearing in the center sub-channels 504 and 506 would be replaced with dual purpose symbols of the type described above. It is generally preferred that the dual purpose symbols be placed in the latter half of the full outbound slot, although this is not necessary in all instances. The dual purpose symbols could be modulated with a lower order modulation than that of the data symbols located throughout the full outbound slot, in the manner indicated above. Alternatively, the dual purpose symbols could comprise copies of dedicated pilot symbols positioned earlier in the full outbound slot in the manner indicated above with reference to FIGS. 29–32. If desired, the dual purpose symbols could be configured according to the lower order modulation and repeated dedicated symbol content, as described above to provide further enhancement of the Time Division Multiple Access communication. As in the arrangement above, use of symbol repetition allows max-ratio combining techniques to be employed to improve data detection of the pilot information encoded within the dual purpose symbol. The derived pilot symbol would then be employed with dedicated pilot symbols to provide an enhanced pilot interpolation of data contained in the full outbound slot. Similar modifications can be made to the split outbound slot described with reference to FIGS. 7–10 and the full reserved inbound slot described with reference to FIGS. 11–14.

While the principles of the invention have been described above in connection with a specific apparatus, it is to be clearly understood that this description is made only by way of example and not as a limitation on the scope of the invention.

What is claimed is:

1. A digital time division multiple access communication system comprising:
    a time slot comprising four quadrature amplitude modulation sub-channels of pre-selected time duration;
    a plurality of sync, pilot and data symbols in respective sync, pilot and data symbol positions of each sub-channel, with the pilot symbols arranged in a pre-selected pilot symbol format;
    the data symbols modulated according to a pre-selected order of modulation; and
    a plurality of dual purpose symbols in respective pilot symbol positions of the pilot symbol format and modulated with an order of modulation less than that of the data symbols, wherein the plurality of dual purpose symbols provide derived pilot symbols and time slot control information.

2. A system of claim 1 wherein at least one of the plurality of dual purpose symbols comprises a color code symbol and a modulated pilot symbol.

3. The system of claim 1 wherein at least one of the plurality of dual purpose symbols comprises an associated control procedure symbol and a modulated pilot symbol.

4. The system of claim 1 wherein the four quadrature amplitude modulation sub-channels comprise two inner channels disposed between outer channels, and the plurality of dual purpose symbols are located in pilot symbol positions in the inner channels.

5. The system of claim 4 wherein pilot symbols of the inner sub-channels are timewise staggered with respect to pilot symbols of the outer sub-channels.

6. The system according to claim 4 wherein the pilot symbol format comprises a spaced array of pilot symbols in the outer sub-channels, timewise staggered with respect to a spaced array of pilot symbols in the inner sub-channels.

7. A digital time division multiple access communication system comprising:
    a time slot comprising four quadrature amplitude modulation sub-channels of pre-selected time duration;
    a plurality of color code, associated control procedure, sync, pilot and data symbols in respective color code, associated control procedure, sync, pilot and data symbol positions of each sub-channel, with the pilot symbols arranged in a pre-selected pilot symbol format; and
    a plurality of dual purpose symbols in respective pilot symbol positions of the pilot symbol format and comprising copies of at least one of the plurality of color code symbols or associated control procedure symbols, wherein the plurality of dual purpose symbols provide derived pilot symbols and time slot control information.

8. A system of claim 7 wherein at least one of the plurality of dual purpose symbols comprises a color code symbol and a modulated pilot symbol.

9. The system of claim 7 wherein at least one of the plurality of dual purpose symbols comprises an associated control procedure symbol and a modulated pilot symbol.

10. The system of claim 7 wherein the four quadrature amplitude modulation sub-channels comprise two inner channels disposed between outer channels, and the plurality of dual purpose symbols are located in pilot symbol positions in the inner channels.

11. The system of claim 10 wherein pilot symbols of the inner sub-channels are timewise staggered with respect to pilot symbols of the outer sub-channels.

12. The system according to claim 10 wherein the pilot symbol format comprises a spaced array of pilot symbols in the outer sub-channels, timewise staggered with respect to a spaced array of pilot symbols in the inner sub-channels.

13. A digital time division multiple access communication system comprising:
    a time slot comprising four quadrature amplitude modulation sub-channels of pre-selected time duration;
    a plurality of color code, associated control procedure, sync, pilot and data symbols in respective sync, pilot and data symbol positions of each sub-channel, with the pilot symbols arranged in a pre-selected pilot symbol format;
    the data symbols modulated according to a pre-selected order of modulation; and
    a plurality of dual purpose symbols comprising copies of at least one of the plurality of color code symbols or associated control procedure symbols, located in respective pilot symbol positions of the pilot symbol format and modulated with an order of modulation less than that of the plurality of data symbols, wherein the plurality of dual purpose symbols provide derived pilot symbols and time slot control information.

14. A system of claim 13 wherein at least one of the plurality of dual purpose symbols comprises a color code symbol and a modulated pilot symbol.

15. The system of claim 13 wherein at least one of the plurality of dual purpose symbol comprises an associated control procedure symbol and a modulated pilot symbol.

16. The system of claim 13 wherein the four quadrature amplitude modulation sub-channels comprise two inner channels disposed between outer channels, and the plurality of dual purpose symbols are located in pilot symbol positions in the inner channels.

17. The system of claim 16 wherein pilot symbols of the inner sub-channels are timewise staggered with respect to pilot symbols of the outer sub-channels.

18. The system according to claim 16 wherein the pilot symbol format comprises a spaced array of pilot symbols in the outer sub-channels, timewise staggered with respect to a spaced array of pilot symbols in the inner sub-channels.

19. A method of digital time division multiple access communication comprising the steps of:
providing a time slot comprising four quadrature amplitude modulation sub-channels of pre-selected time duration;
providing a plurality of color code, associated control procedure, sync, pilot and data symbols in respective sync, pilot and data symbol positions in said time slot, with the pilot symbols arranged in a pre-selected pilot symbol format;
modulating the data symbols with a pre-selected order of modulation;
providing a derived pilot symbol;
modulating the derived pilot symbol with an order of modulation less than that of the data symbols to produce a dual purpose symbol comprising at least one of the plurality of color code symbols or associated control procedure symbols, wherein the dual purpose symbol provide the derived pilot symbol and time slot control information; and
placing the dual purpose symbol in a pre-selected pilot symbol position of the pilot symbol format.

20. The method of claim 19 wherein said step of placing the dual purpose symbol in the pre-selected pilot symbol position of the pilot symbol format comprises placing the dual purpose symbol in a pre-selected pilot symbol position in an inner sub-channel of the pilot symbol format.

21. The method of claim 19 further comprising the step of demodulating the dual purpose color code symbol or the dual purpose associated control procedure symbol to produce the derived pilot symbol.

22. The method of claim 21 further comprising the step of performing pilot interpolation on the dual purpose color code symbol or the dual purpose associated control procedure symbol to produce the derived pilot symbol.

23. The method of claim 19 wherein the dual purpose color code symbol or the dual purpose associated control procedure symbol comprises the derived pilot symbol, the method further comprising the steps of;
providing a second derived pilot symbol;
modulating the second derived pilot symbol with an order of modulation less than that of the data symbols to produce a dual purpose associated control procedure symbol;
placing the dual purpose associated control procedure symbol in a pre-selected pilot symbol position of the pilot symbol format;
demodulating the dual purpose color code symbol to produce the derived pilot symbol; and
performing pilot interpolation on the dual purpose associated control procedure symbol with the derived pilot symbol to produce a decoded associated control procedure symbol which comprises another derived pilot symbol.

24. The method of claim 23 further comprising the step of performing pilot interpolation with the derived pilot symbols and the pilot symbols to perform pilot interpolation on the data symbols.

25. A method of digital time division multiple access communication system comprising the steps of:
providing a time slot comprising four quadrature amplitude modulation sub-channels of pre-selected time duration;
providing a plurality of color code, associated control procedure, sync, pilot and data symbols in respective color code, associated control procedure, sync, pilot and data symbol positions in the time slot, with the pilot symbols arranged in a pre-selected pilot symbol format;
copying at least one of the plurality of color code symbols or associated control procedure symbols to provide a dual purpose symbol, wherein the dual purpose symbol provides derived pilot symbol and time slot control information; and
placing the dual purpose symbol in a pre-selected pilot symbol position of the pilot symbol format.

26. The method of claim 25 further comprising the step of demodulating the dual purpose symbol to produce the derived pilot symbol.

27. The method of claim 26 further comprising the step of performing pilot interpolation on the dual purpose symbol to produce the derived pilot symbol.

28. The method of claim 25 wherein the plurality dual purpose symbol comprises at least one copied color code symbol, the method further comprising the steps of:
demodulating the dual purpose color code symbol to produce a trial value;
performing pilot interpolation on the trial value;
demodulating the copied color code symbol; and
performing pilot interpolation on the copied color code symbol to produce a second trial value;
max ratio combining the first and the second trial values to produce a derived pilot symbol at the color code position of the copied color code symbol.

29. The method of claim 28 wherein the step of performing pilot interpolation on the trial value includes performing pilot interpolation with substantially all of the pilot symbols in the time slot.

30. The method of claim 27 further comprising the step of performing pilot interpolation with the derived pilot symbol and the pilot symbols to perform pilot interpolation on the data symbols.

31. A method of digital time division multiple access communication system comprising the steps of:
providing a time slot comprising four quadrature amplitude modulation sub-channels of pre-selected time duration;
providing a plurality of color code, associated control procedure, sync, pilot and data symbols in respective color code, associated control procedure, sync, pilot and data symbol positions in the time slot, with the pilot symbols arranged in a pre-selected pilot symbol format;
modulating the data symbols with a pre-selected order of modulation;
copying at least one of the plurality of color code symbols or associated control procedure symbols to produce a derived pilot symbol;

modulating the derived pilot symbol with an order of modulation less than that of the data symbols to produce a dual purpose symbol, wherein the dual purpose symbol provides the derived pilot symbol and time slot control information; and placing the dual purpose symbol in a pre-selected pilot symbol position of the pilot symbol format.

32. The method of claim 31 further comprising the step of demodulating the dual purpose symbol to produce the derived pilot symbol.

33. The method of claim 32 further comprising the step of performing pilot interpolation on the dual purpose symbol.

34. The method of claim 31 wherein the dual purpose symbol comprises the at least one copied code symbol, the method further comprising the steps of:

copying an associated control procedure symbol located at an earlier symbol position to produce a second derived pilot symbol;

modulating the second derived pilot symbol with an order of modulation less than that of the data symbols to produce a dual purpose associated control procedure symbol;

placing the dual purpose associated control procedure symbol in a pre-selected pilot symbol position of the pilot symbol format;

demodulating the copied color code symbol to produce a first trial value and performing pilot interpolation on the copied color code symbol to produce a second trial value;

max ratio combining the first and the second trial values to produce the derived pilot symbol at the color code position of the copied color code symbol.

35. The method of claim 34 wherein the step of performing pilot interpolation on the copied symbol includes performing pilot interpolation with substantially all of the pilot symbols in the time slot.

36. The method of claim 31 further comprising the step of performing pilot interpolation with the derived pilot symbol and the pilot symbols to perform pilot interpolation on the data symbols.

* * * * *